US008662448B2

(12) United States Patent
Weston et al.

(10) Patent No.: US 8,662,448 B2
(45) Date of Patent: Mar. 4, 2014

(54) SYSTEM AND METHOD FOR INSULATING FRAME MEMBER

(75) Inventors: Adam R. Weston, Brier, WA (US); Guillaume Cousineau-Bouffard, Seattle, WA (US)

(73) Assignee: The Boeing Company, Chicago, IL (US)

( * ) Notice: Subject to any disclaimer, the term of this patent is extended or adjusted under 35 U.S.C. 154(b) by 262 days.

(21) Appl. No.: 13/154,422

(22) Filed: Jun. 6, 2011

(65) Prior Publication Data

US 2012/0305706 A1    Dec. 6, 2012

(51) Int. Cl.
*B64C 1/00* (2006.01)

(52) U.S. Cl.
USPC ........................................ 244/119; 244/121

(58) Field of Classification Search
USPC .................. 244/119, 121, 171.7, 1 N, 129.2;
52/407.3–407.5, 742.1, 742.12;
220/560.15, 592.1, 592.25, 592.26
See application file for complete search history.

(56) References Cited

U.S. PATENT DOCUMENTS

| | | | |
|---|---|---|---|
| 2,324,654 A | 7/1943 | Tinnerman et al. | |
| 2,912,724 A | 11/1959 | Wilkes | |
| 3,231,944 A | 2/1966 | Bennett | |
| 3,567,162 A * | 3/1971 | Lea | 244/121 |
| 4,235,398 A | 11/1980 | Johnson | |
| 4,291,851 A | 9/1981 | Johnson | |
| 4,308,309 A | 12/1981 | Leiser et al. | |
| 4,318,260 A * | 3/1982 | Siegel et al. | 52/407.4 |
| 4,344,591 A | 8/1982 | Jackson | |
| 4,441,726 A | 4/1984 | Uhl | |
| 4,488,619 A | 12/1984 | O'Neill | |
| 4,927,705 A | 5/1990 | Syme et al. | |
| 4,940,112 A | 7/1990 | O'Neill | |
| 5,030,518 A | 7/1991 | Keller | |
| 5,312,848 A | 5/1994 | Klapper et al. | |

(Continued)

FOREIGN PATENT DOCUMENTS

| | | |
|---|---|---|
| CA | 2278856 | 6/1999 |
| CA | 2319355 | 12/1999 |

(Continued)

OTHER PUBLICATIONS

International Search Report and Written Opinion of the International Searching Authority, mailed Oct. 17, 2012, for PCT/US2012/038985, Applicant The Boeing Company, 15 pages.

(Continued)

*Primary Examiner* — Timothy D Collins
*Assistant Examiner* — Jamie S Stehle

(57) ABSTRACT

There is provided an insulation system and method for a transport vehicle. The system has first and second frame members; a first rigid foam insulation member extending between the first and second frame members; a second rigid foam insulation member, where a first sidewall of the first insulation member integrates with a second sidewall of the second insulation member; and, a third rigid foam insulation member where the second sidewall of the first insulation member integrates with a first sidewall of the third insulation member. Each of the insulation members is surrounded by a protective layer. When the insulation members are integrated, the second and third insulation members impart one or more compression forces on the first insulation member and on the first frame member in order to secure the first insulation member in place without use of any fastener device.

25 Claims, 15 Drawing Sheets

(56) References Cited

U.S. PATENT DOCUMENTS

| | | | |
|---|---|---|---|
| 5,472,760 A | 12/1995 | Norvell | |
| 5,511,747 A * | 4/1996 | Parrot et al. | 244/159.1 |
| 5,545,273 A | 8/1996 | Rasky et al. | |
| 5,611,504 A | 3/1997 | Haynes et al. | |
| 5,806,272 A | 9/1998 | Lafond | |
| 5,985,362 A | 11/1999 | Specht et al. | |
| 7,040,575 B2 | 5/2006 | Struve et al. | |
| 7,083,147 B2 * | 8/2006 | Movsesian et al. | 428/71 |
| 7,946,525 B2 * | 5/2011 | Groning | 244/1 N |
| 2001/0041753 A1 | 11/2001 | Thom | |
| 2002/0168184 A1 | 11/2002 | Meisiek | |
| 2006/0118676 A1 | 6/2006 | Novak et al. | |
| 2006/0145006 A1 | 7/2006 | Drost | |
| 2006/0194893 A1 | 8/2006 | Prybutok | |
| 2009/0032640 A1 | 2/2009 | Moores et al. | |
| 2010/0199583 A1 | 8/2010 | Behrens et al. | |
| 2011/0091679 A1 * | 4/2011 | Hysky | 428/71 |
| 2012/0234979 A1 * | 9/2012 | Smith | 244/158.1 |

FOREIGN PATENT DOCUMENTS

| | | |
|---|---|---|
| DE | 2035807 | 7/1970 |
| DE | 3513662 A1 | 10/1986 |
| DE | 19848677 A1 | 7/1999 |
| DE | 19848679 A1 | 7/1999 |
| DE | 19856377 A1 | 6/2000 |
| DE | 10001778 A1 | 8/2000 |
| EP | 0692424 A2 | 1/1996 |
| EP | 0758603 A2 | 2/1997 |
| EP | 2311722 A1 | 4/2011 |
| GB | 1518802 A | 7/1978 |
| JP | 2006119228 A | 5/2006 |
| WO | 2005/095206 A1 | 10/2005 |
| WO | 2007131583 A1 | 11/2007 |
| WO | WO2012052484 A1 | 4/2012 |

OTHER PUBLICATIONS

G.P. Mathur et al., "Aircraft Cabin Noise Control With Smart Foam Treatment on Fuselage Sidewall-Laboratory Tests", American Institute of Aeronautics & Astronautics, AIAA-2001-2231, 2001, pp. 1-8.

National Aeronautics and Space Administration, NASA Facts, "Orbiter Thermal Protection System", Mar. 1997, FS-2000-06-29-KSC, 4 pages.

Ed Memi, "Analyze This: Boeing Provides Data, Work to NASA for Safe Space Shuttle Re-Entry", Boeing Frontiers, Oct. 2005, vol. 04, Issue 6, 3 pages.

Ed Memi, "Boeing Engineers Assist NASA in Shuttle Tile Work", Jan. 25, 2006, 1 page, available at <www.boeing.com/news/releases/2006/q1/060125a_nr.html>, last visited Mar. 14, 2011.

Wikipedia, Definition of "Bulk modulus", 5 pages, available at <http://en.wikipedia.org/wiki/Bulk_modulus>, last visited Mar. 14, 2011.

Opposition to Boeing EP 1735210 listing cited documents, Feb. 13, 2009, 26 pages.

International Search Report and Written Opinion of the International Searching Authority, mailed Jul. 4, 2012, for international application PCT/US2012/023511, 11 pages.

* cited by examiner

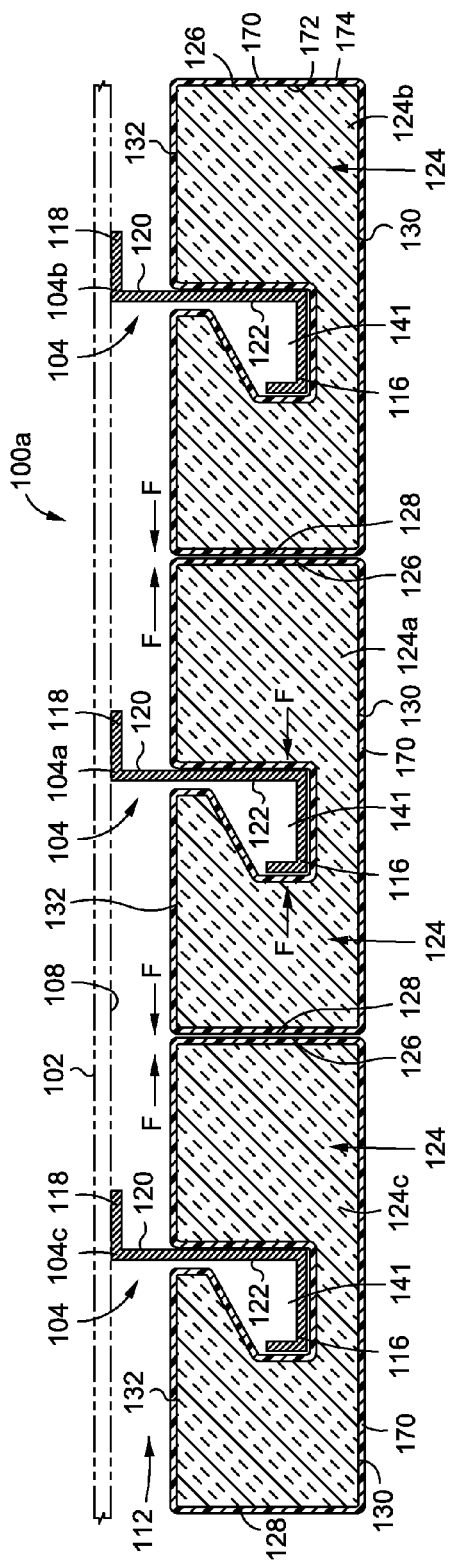
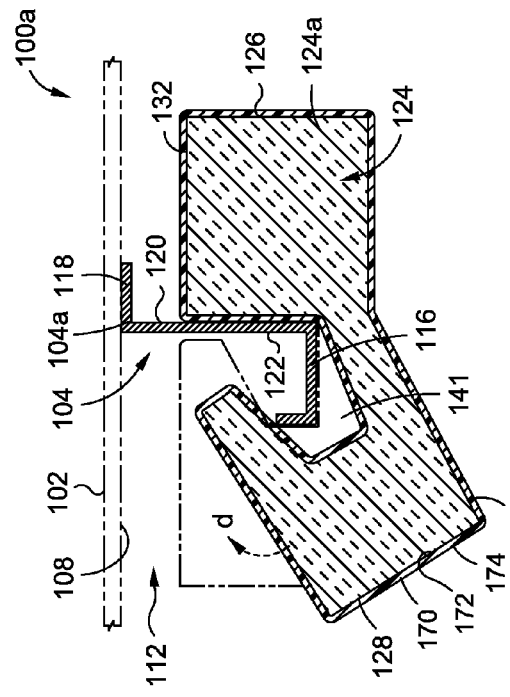
FIG. 5A
FIG. 5B

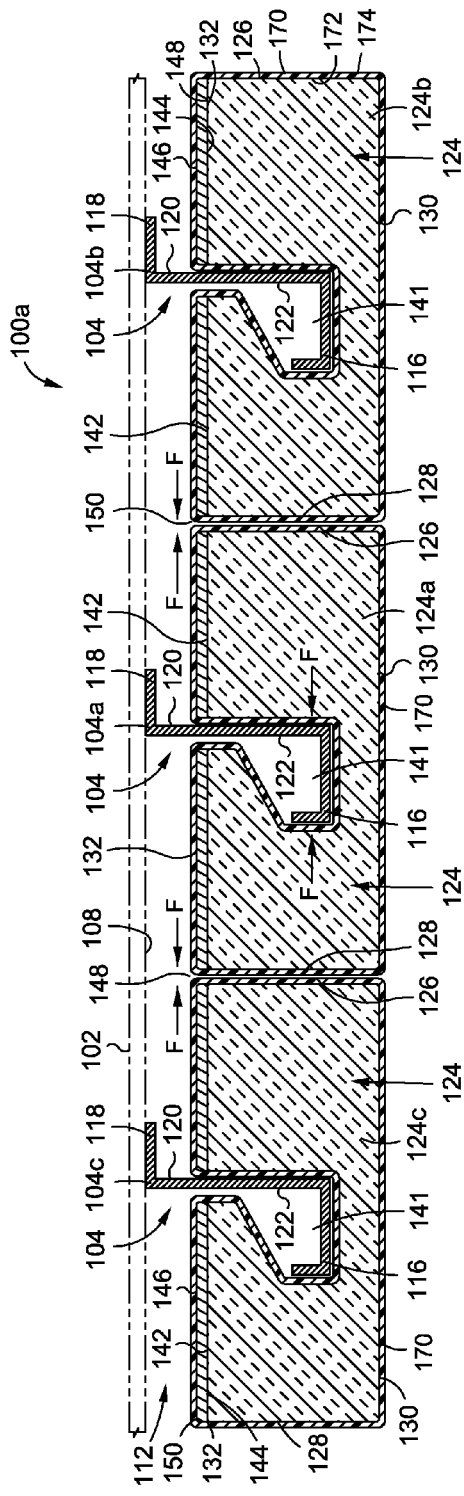
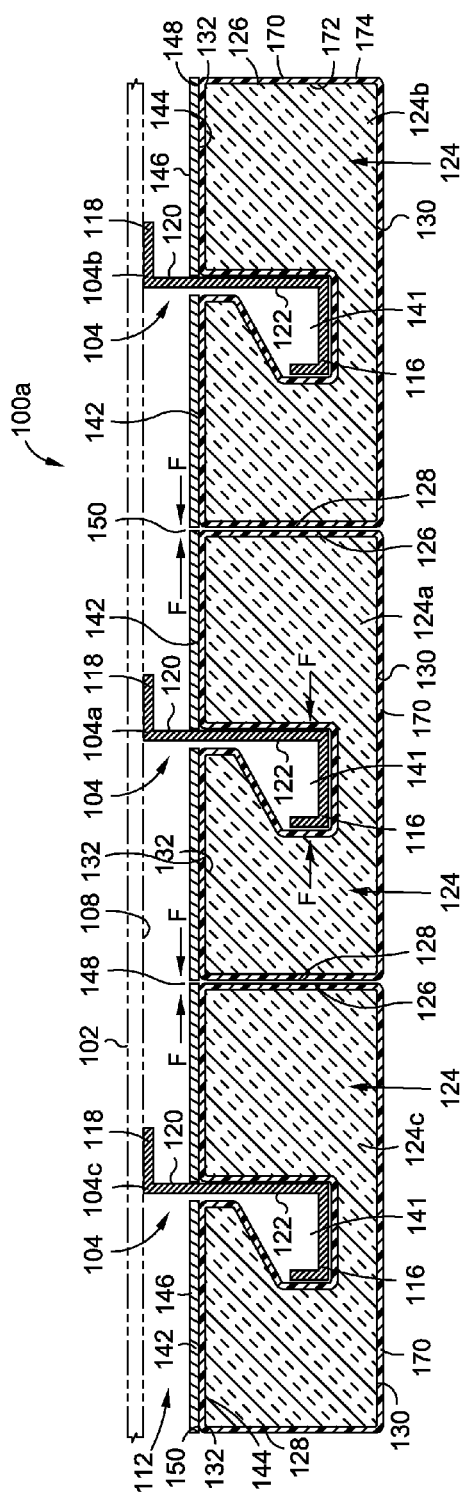
FIG. 5C
FIG. 5D

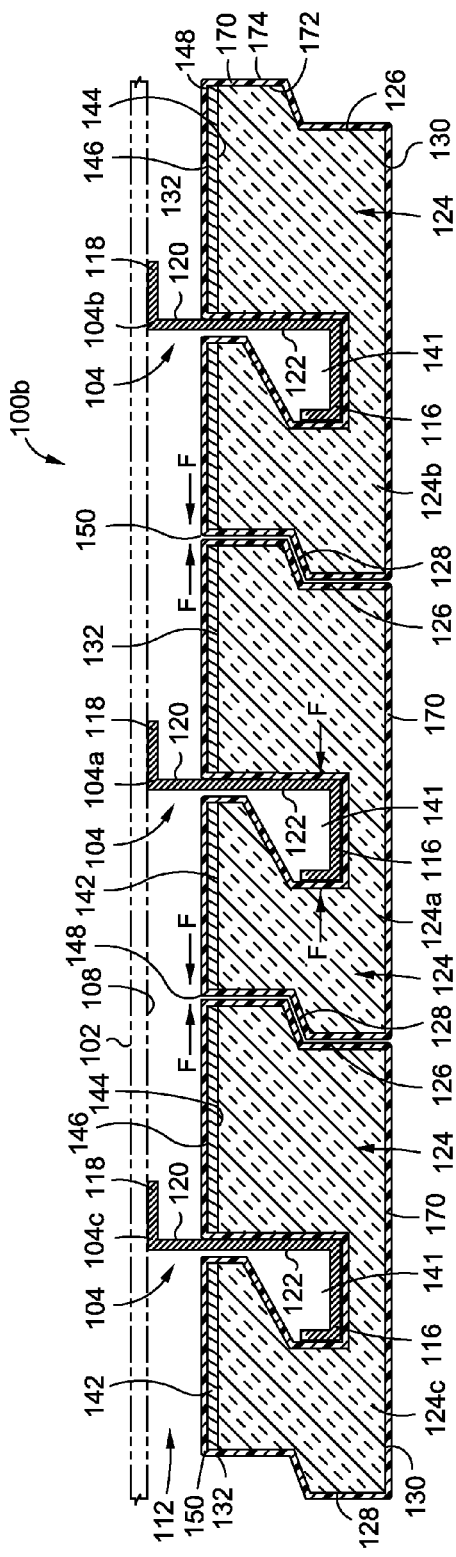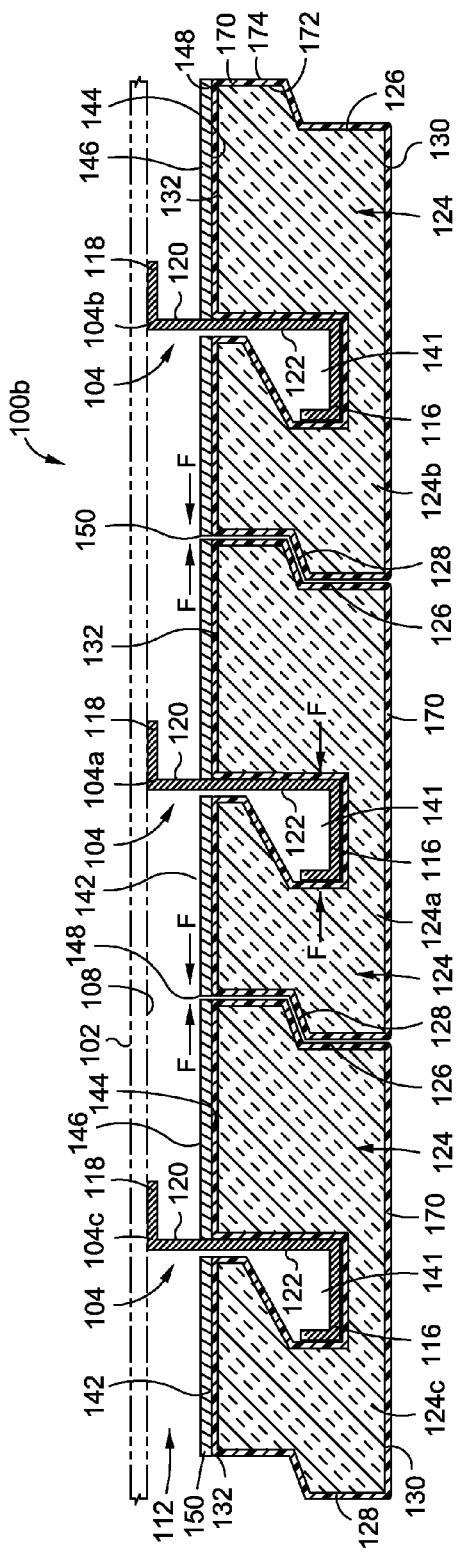

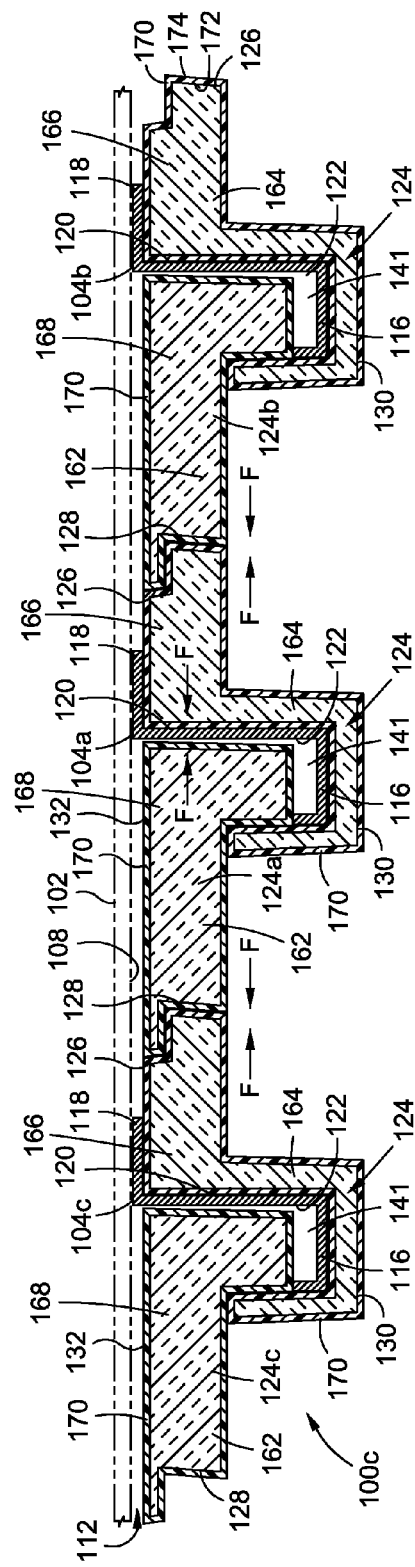
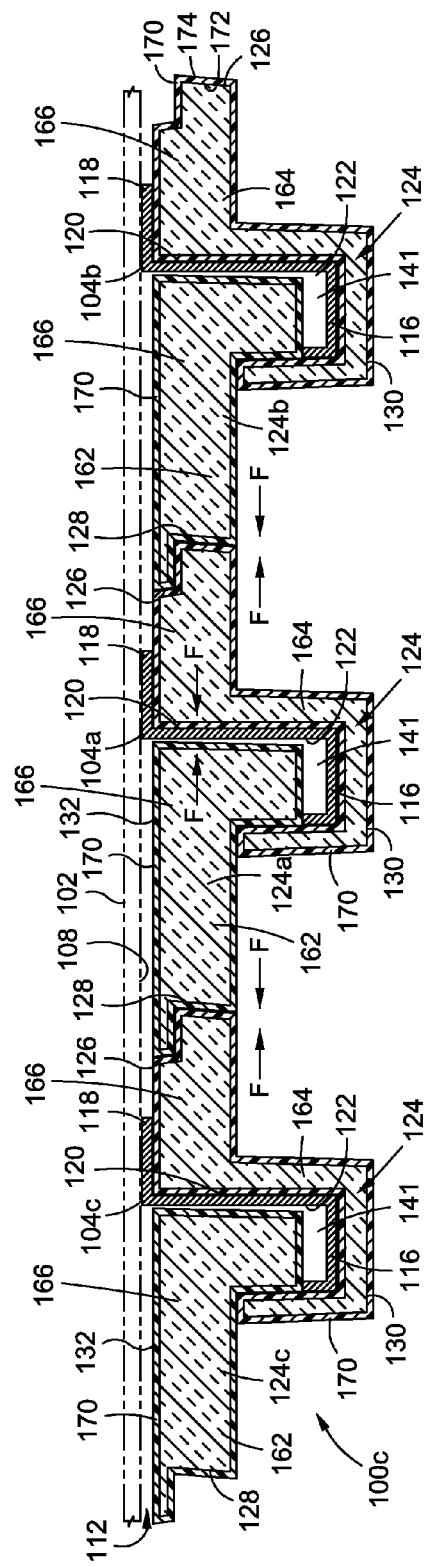
FIG. 7A
FIG. 7B

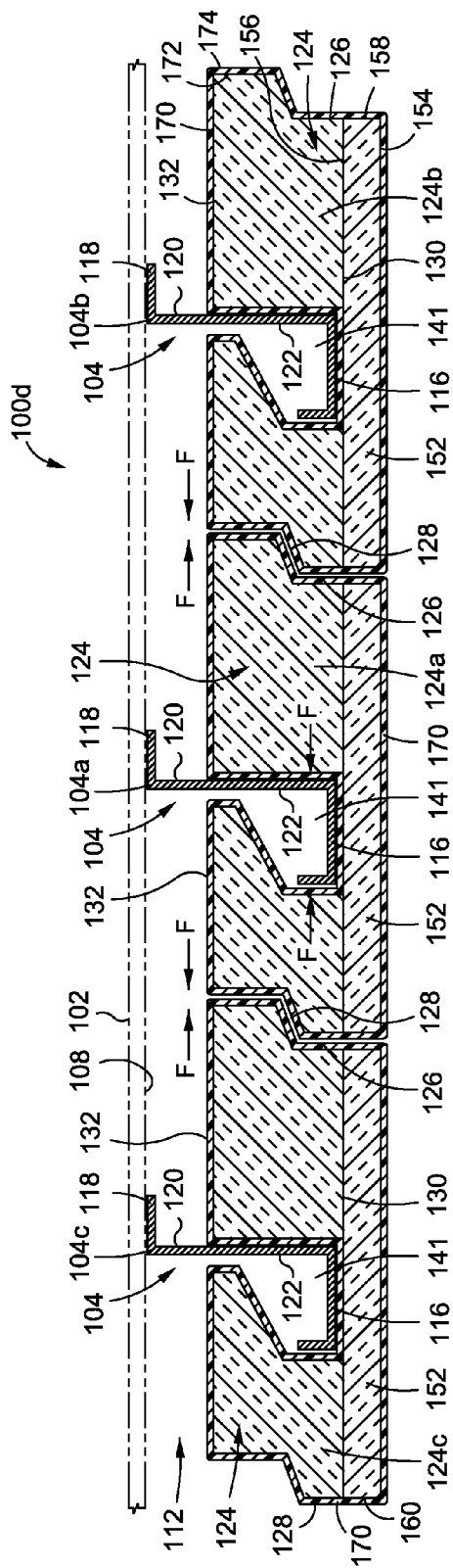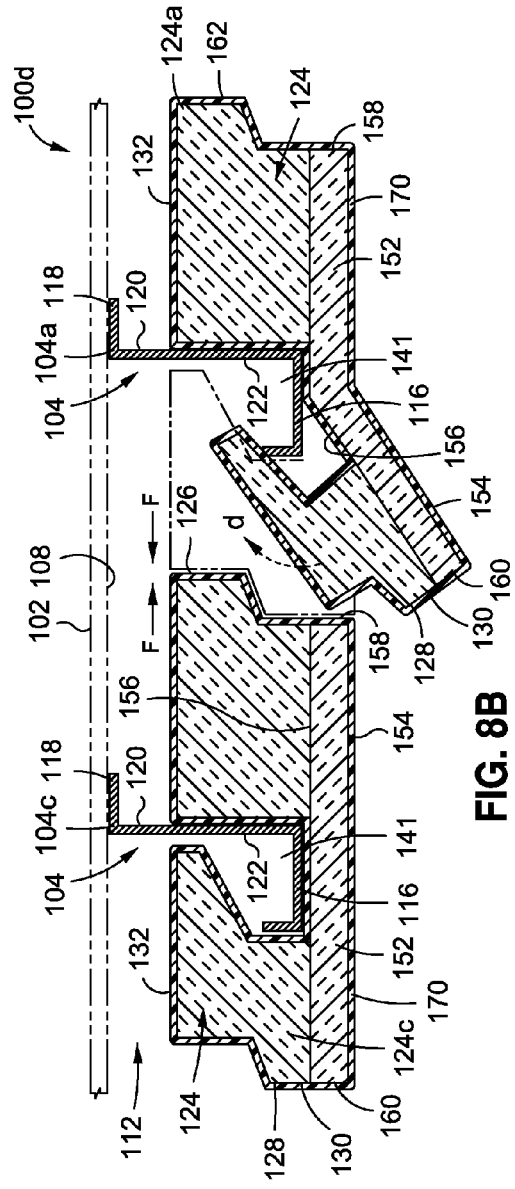

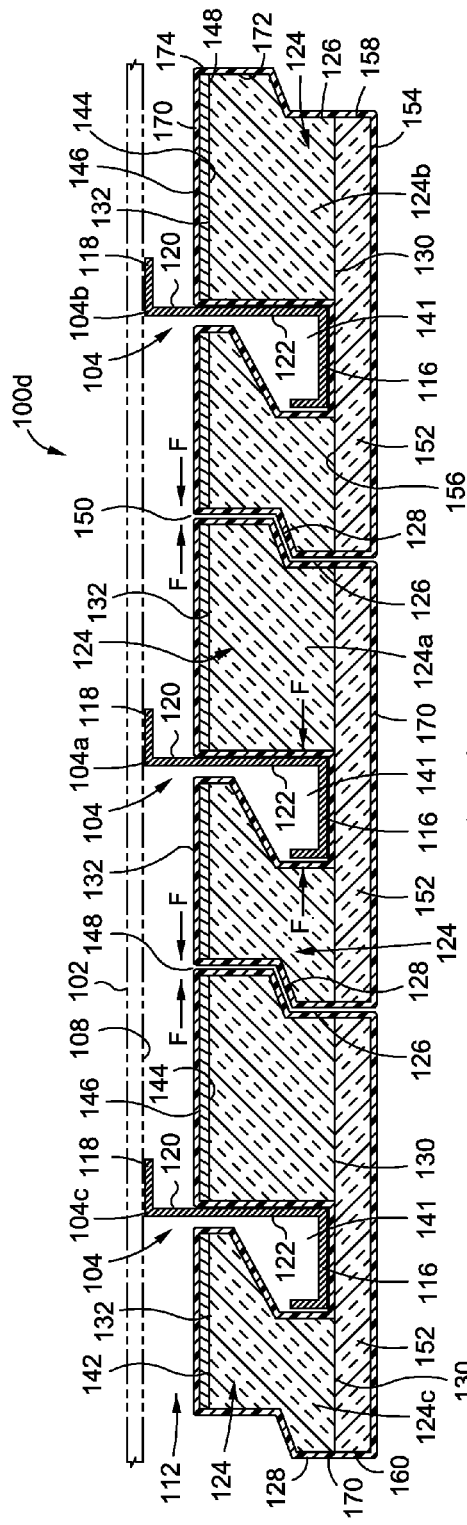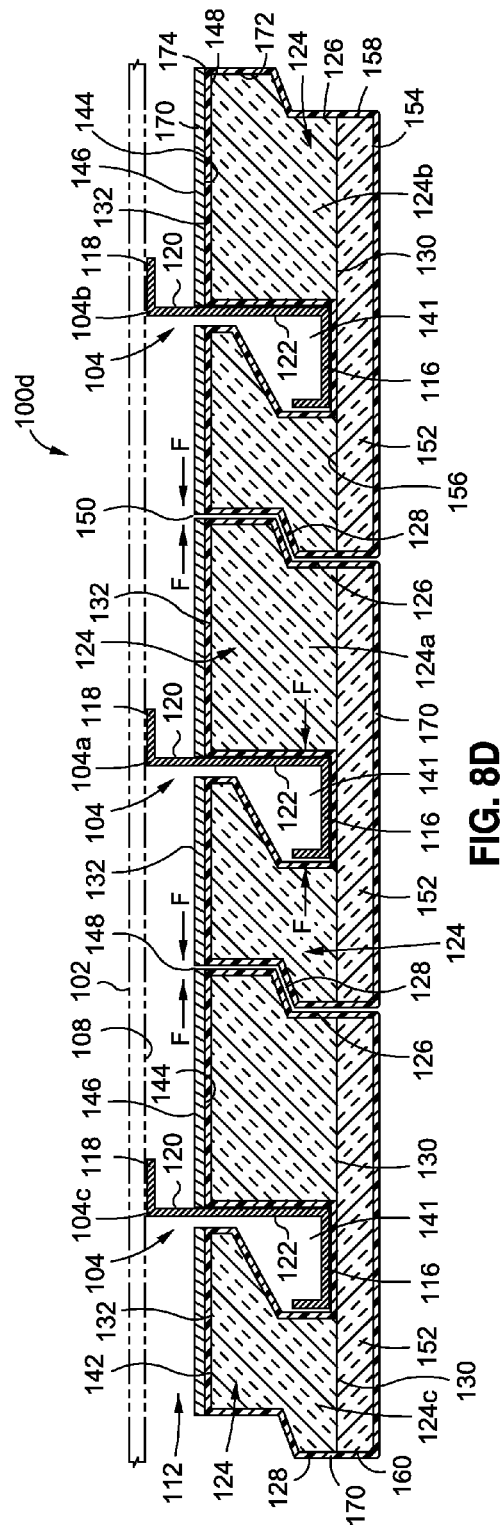

SYSTEM AND METHOD FOR INSULATING FRAME MEMBER

BACKGROUND

1) Field of the Disclosure

The disclosure relates generally to systems and methods for insulating structures in vehicles and architectural structures, and more particularly, to system and methods for insulating structural frame members in transport vehicles.

2) Description of Related Art

Insulation is typically provided on the interior of structures of transport vehicles, such as aircraft, aerospace vehicles, trains, automobiles, buses, watercraft and other transport vehicles. Such insulation can provide a thermal barrier to regulate temperature for the comfort of the vehicle occupants, can provide an acoustic barrier to reduce engine noise and/or noise from outside air turbulence, and can provide a protective barrier against moisture and temperature extremes that may damage or corrode mechanical and structural components within the transport vehicle. Multiple insulation blankets, for example, in the form of bay blankets, capstrips and/or over blankets, may be combined to thermally and acoustically insulate structural components of the wall or body of the transport vehicle, such as aircraft airframe comprising aircraft frame members.

Known systems and methods for installing insulation in transport vehicles, for example, aircraft and aerospace vehicles, include manual systems and methods. Such known manual systems and methods typically involve using a variety of fastener devices to secure the insulation to the structural components of the wall or body of the transport vehicle, such as the aircraft airframe comprising aircraft frame members, or to secure the multiple insulation blankets to each other. For example, multiple insulation blankets may be mechanically fastened to the aircraft frame members of the airframe or sewn together to cover, respectively, the fuselage wall or skin and stiffeners of the airframe. Such fastener devices may include steel or aluminum spring clips or clamps, plastic or metal pins having a retaining device, hook and loop fastening tape, or other suitable fastener devices.

FIG. 2 is an illustration of a partial front perspective view of a known aircraft fuselage interior 26. The aircraft fuselage interior 26 typically includes a fuselage wall or skin 28, aircraft frame members 30 coupled to the fuselage wall or skin 28, and aircraft windows 32. FIG. 3 is an illustration of a partial front perspective view of the known aircraft fuselage interior 26 of FIG. 2 showing known insulation blankets 34 secured to the aircraft frame members 30 with known fastener devices 36, typically in the form of clip fasteners 38 (see FIGS. 4A, 4B). FIG. 4A is an illustration of a cross-sectional top view of a portion of a known aircraft fuselage interior 40 with a known clip fastener 38 installed. FIG. 4B is an illustration of a cross-sectional top exploded view of the known aircraft fuselage interior 40 and clip fastener 38 of FIG. 4A. FIGS. 4A and 4B show the cross-section of the aircraft fuselage interior 40 having a fuselage wall or skin 42 and a first end 44 of an aircraft frame member 46 coupled or attached to the fuselage wall or skin 42. Insulation blankets 48a, 48b are positioned on sides 50a, 50b of the aircraft frame member 46 and between adjacent aircraft frame members 46. The insulation blankets 48a, 48b insulate the fuselage wall or skin 42. The insulation blanket 48a may have a plastic film extension tab 52 (see FIG. 4B) that extends alongside 50a and around a second end 54 of the aircraft frame member 46. A flexible insulation member 56, for example, in the form of an insulation blanket 58, may be attached with tape 60 (see FIG. 4B) to the insulation blanket 48b and may wrap over the tab 52 that is covering the second end 54 and sides 50a, 50b of the aircraft frame member 46. The clip fastener 38 may be used to secure the insulation blanket 58 to the aircraft frame member 46. FIG. 4A shows an untucked portion 62 of the insulation blanket 58 with installation of the clip fastener 38.

However, using such known fastener devices to secure the insulation to the transport vehicle structure or to secure the insulation blankets to each other may take time and labor to install, which can increase the cost of installation, labor, and manufacturing. Further, using such known fastener devices to secure the insulation to the transport vehicle structure or to secure the insulation blankets to each other may require procurement and storage of the fastener devices, may require a longer lead time for installation, may require a larger part count, may take time, space, and labor to organize and inventory, all of which may, in turn, increase the cost of installation, labor, and manufacturing. Moreover, using such known fastener devices to secure the insulation to the transport vehicle structure or to secure the insulation blankets to each other may add to the overall weight of the transport vehicle, which can, in turn, increase fuel costs. In addition, using known fastener devices to secure the insulation to the transport vehicle structure or to secure the insulation blankets to each other may be result in acoustic leakage between insulation blankets if the fastener devices are not properly or adequately secured.

Known systems and methods for insulating structural components of transport vehicles exist. For example, U.S. Pat. No. 7,040,575 discloses foam composite insulation for aircraft. However, such foam composite insulation does not provide a fastener-free insulation for aircraft frame members themselves.

Accordingly, there is a need in the art for a system and method for insulating a frame member of a transport vehicle, such as an aircraft, that provide advantages over known systems and methods.

SUMMARY

This need for a system and method for insulating a frame member of a transport vehicle, such as an aircraft, is satisfied. As discussed in the below detailed description, embodiments of the system and method may provide significant advantages over existing systems and methods.

In an embodiment of the disclosure, there is provided an insulation system for a transport vehicle. The system comprises first and second frame members in adjacent attachment to a wall of a transport vehicle. The system further comprises a first rigid foam insulation member having a first sidewall and a second sidewall, the first insulation member extending between the first and second frame members and extending over a first free end of the first frame member. The system further comprises a second rigid foam insulation member adjacent the first sidewall of the first insulation member, the second insulation member extending over a first free end of the second frame member, and the first sidewall of the first insulation member being configured to integrate with a second sidewall of the second insulation member. The system further comprises a third rigid foam insulation member adjacent the second sidewall of the first insulation member, the second sidewall of the first insulation member being configured to integrate with a first sidewall of the third insulation member. Each of the first, second, and third insulation members is surrounded by a protective layer. When the first, second, and third insulation members are integrated, the second and third insulation members impart one or more compression forces on the first insulation member and on the first frame member in order to secure the first insulation member in place without use of any fastener device.

In another embodiment of the disclosure, there is provided an insulation system for an aircraft. The system comprises first and second frame members in adjacent attachment to a fuselage wall of an aircraft. The system further comprises a first rigid foam insulation member having a first sidewall and a second sidewall, the first insulation member extending to a position between the first and second frame members and substantially covering the first frame member. The system further comprises a second rigid foam insulation member adjacent the first sidewall of the first insulation member, the second insulation member having a first sidewall and a second sidewall and substantially covering the second frame member, and the first sidewall of the first insulation member being configured to integrate with the second sidewall of the second insulation member. The system further comprises a third rigid foam insulation member adjacent the second sidewall of the first insulation member, the third insulation member having a first sidewall and a second sidewall and substantially covering a third frame member, and the second sidewall of the first insulation member being configured to integrate with the first sidewall of the third insulation member. Each of the first, second, and third insulation members is surrounded by a protective layer. When the first, second, and third insulation members are integrated, the second and third insulation members impart one or more compression forces on the first insulation member and on the first frame member in order to secure the first insulation member in place without use of any fastener device.

In another embodiment of the disclosure, there is provided a method of insulating a frame member of a transport vehicle. The method comprises providing at least first and second frame members in adjacent attachment to a wall of a transport vehicle. The method further comprises providing at least first, second, and third rigid foam insulation members each having a first sidewall and a second sidewall and each surrounded by a protective layer. The method further comprises substantially covering the first frame member with the first rigid foam insulation member and substantially covering the second frame member with the second rigid foam insulation member. The method further comprises positioning the first insulation member between the second insulation member and the third insulation member. The method further comprises integrating the first sidewall of the first insulation member with the second sidewall of the second insulation member, and integrating the second sidewall of the first insulation member with the first sidewall of the third insulation member, such that the second and third insulation members impart one or more compression forces on the first insulation member and on the first frame member in order to secure the first insulation member in place without use of any fastener device.

In another embodiment of the disclosure, there is provided a method of insulating an aircraft frame member. The method comprises providing at least first and second aircraft frame members in adjacent attachment to a fuselage wall of an aircraft. The method further comprises providing at least first, second, and third rigid foam insulation members each having a first sidewall and a second sidewall and each surrounded by a protective layer. The method further comprises substantially covering the first aircraft frame member with the first rigid foam insulation member and substantially covering the second aircraft frame member with the second rigid foam insulation member. The method further comprises positioning the first insulation member between the second insulation member and the third insulation member. The method further comprises integrating the first sidewall of the first insulation member with the second sidewall of the second insulation member, and integrating the second sidewall of the first insulation member with the first sidewall of the third insulation member, such that the second and third insulation members impart one or more compression forces on the first insulation member and on the first aircraft frame member in order to secure the first insulation member in place without use of any fastener device.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 5A is an illustration of a cross-sectional top view of one of the exemplary embodiments of an insulation system of the disclosure;

FIG. 5B is an illustration of a cross-sectional top view showing the installation of one of the rigid foam insulation members in the insulation system of FIG. 5A;

FIG. 5C is an illustration of a cross-sectional top view of the insulation system of FIG. 5A having a barrier layer inside of a protective layer;

FIG. 5D is an illustration of a cross-sectional top view of the insulation system of FIG. 5A having a barrier layer outside of a protective layer;

FIG. 6C is an illustration of a cross-sectional top view of the insulation system of FIG. 6A having a barrier layer inside of a protective layer;

FIG. 6D is an illustration of a cross-sectional top view of the insulation system of FIG. 6A having a barrier layer outside of a protective layer;

FIG. 7A is an illustration of a cross-sectional top view of yet another one of the exemplary embodiments of an insulation system of the disclosure having rigid foam insulation members comprised of two portions being of different materials;

FIG. 7B is an illustration of a cross-sectional top view of the insulation system of FIG. 7A having rigid foam insulation members comprised of two portions being of the same material;

FIG. 8A is an illustration of a cross-sectional top view of yet another one of the exemplary embodiments of an insulation system of the disclosure having a flexible insulation layer;

FIG. 8B is an illustration of a cross-sectional top view showing the installation of one of the rigid foam insulation members in the insulation system of FIG. 8A;

FIG. 8C is an illustration of a cross-sectional top view of the insulation system of FIG. 8A having a barrier layer inside of a protective layer;

FIG. 8D is an illustration of a cross-sectional top view of the insulation system of FIG. 8A having a barrier layer outside of a protective layer;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
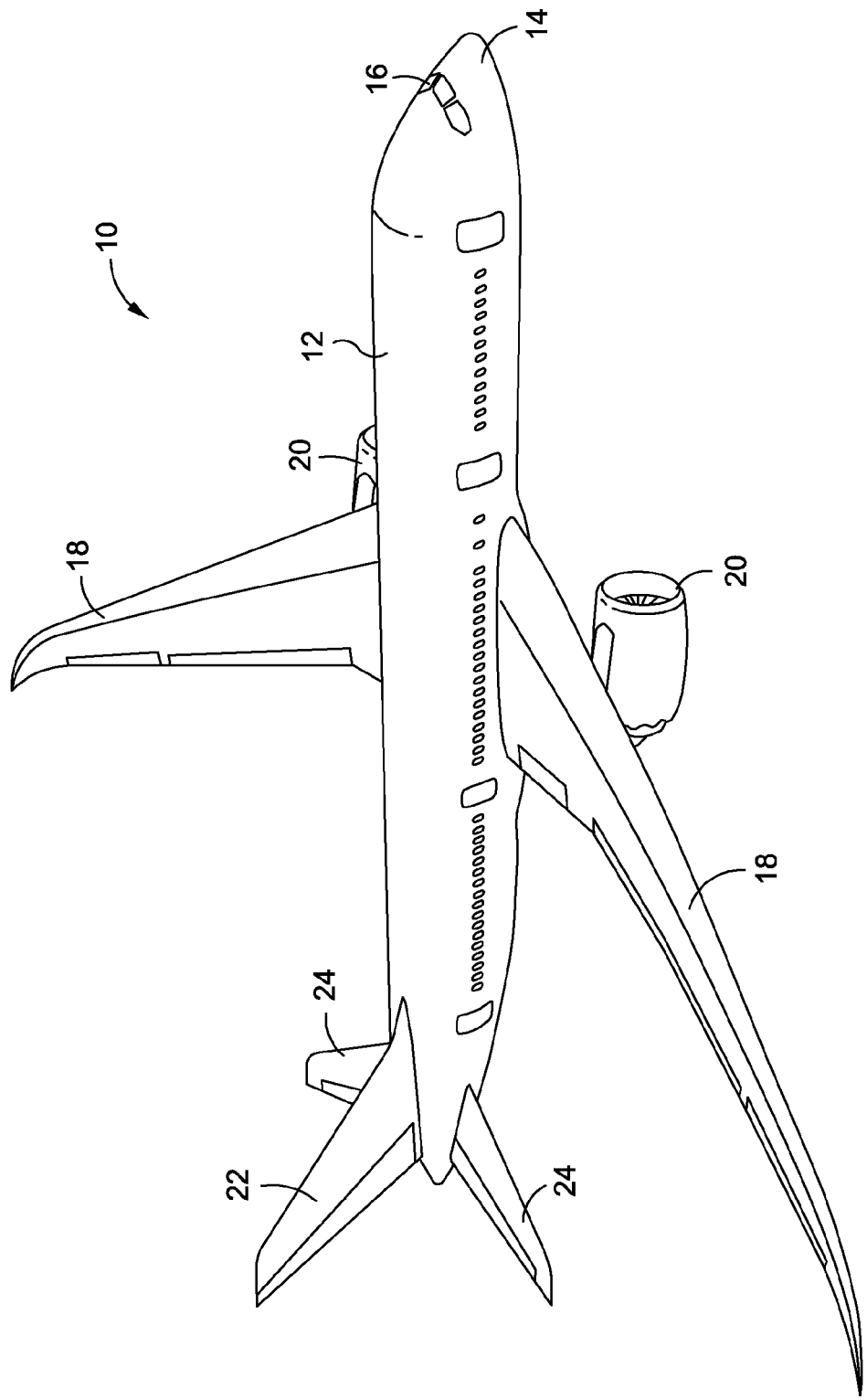
FIG. 1 is an illustration of a perspective view of an exemplary aircraft for which one of the embodiments of an insulation system and method of the disclosure may be used.
Figure 2:
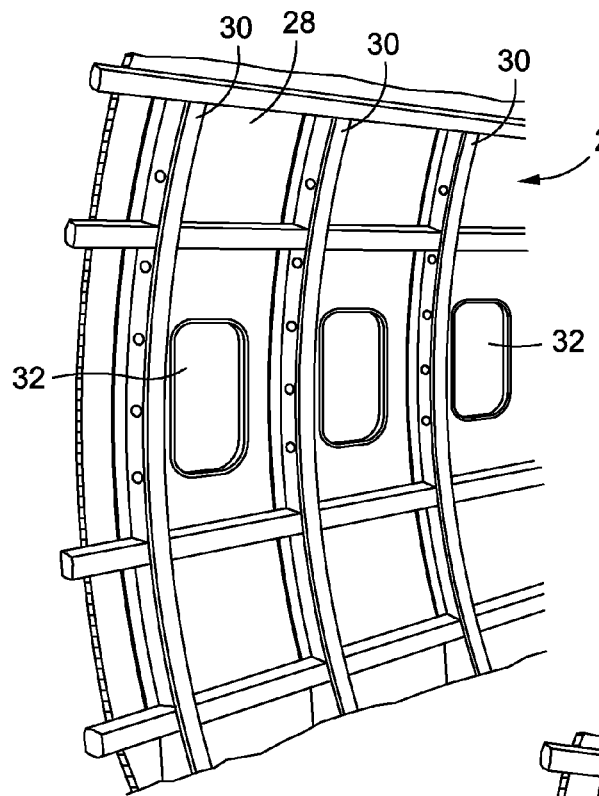
FIG. 2 is an illustration of a partial front perspective view of a known aircraft fuselage interior.

Now referring to the Figures, FIG. 1 is an illustration of a perspective view of an exemplary aircraft 10 for which at least one of the embodiments of an insulation system 100, 100a, 100b, 100c, 100d (see FIGS. 5A-10B), insulation method 200 (see FIG. 11) or insulation method 300 (see FIG. 12) may be used. The aircraft 10 comprises a fuselage 12, a nose 14, a cockpit 16, wings 18 operatively coupled to the fuselage 12, one or more propulsion units 20, a tail vertical stabilizer 22, and one or more tail horizontal stabilizers 24. Although the aircraft 10 shown in FIG. 1 is generally representative of a commercial passenger aircraft, the insulation systems 100, 100a, 100b, 100c, 100d and methods 200, 300 disclosed herein may also be employed in the insulation of other types of aircraft. More specifically, the teachings of the disclosed embodiments may be applied to the insulation of other passenger aircraft, cargo aircraft, military aircraft, rotorcraft, and other types of aircraft or aerial vehicles, as well as aerospace vehicles such as satellites, space launch vehicles, rockets, and other types of aerospace vehicles. It may also be appreciated that embodiments of systems, methods and apparatuses in accordance with the disclosure may be utilized in other vehicles, such as boats and other watercraft, trains, automobiles, trucks, buses, and other types of vehicles. The embodiments of systems, methods and apparatuses in accordance with the disclosure may also be used in buildings, houses, and other architectural structures.

Figure 9:
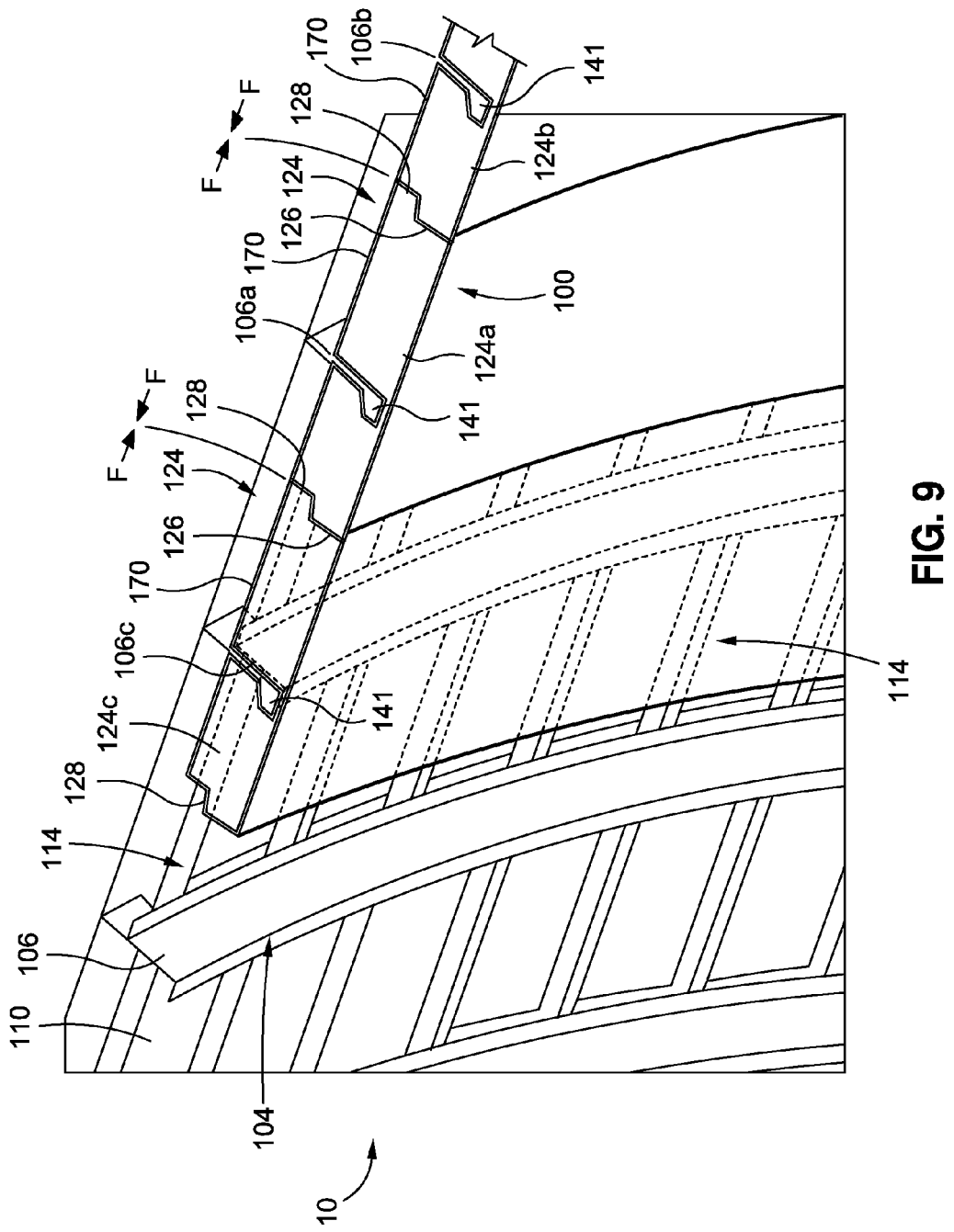
FIG. 9 is an illustration of a partial front perspective view of one of the embodiments of an insulation system of the disclosure installed in an aircraft.
Figure 10A:
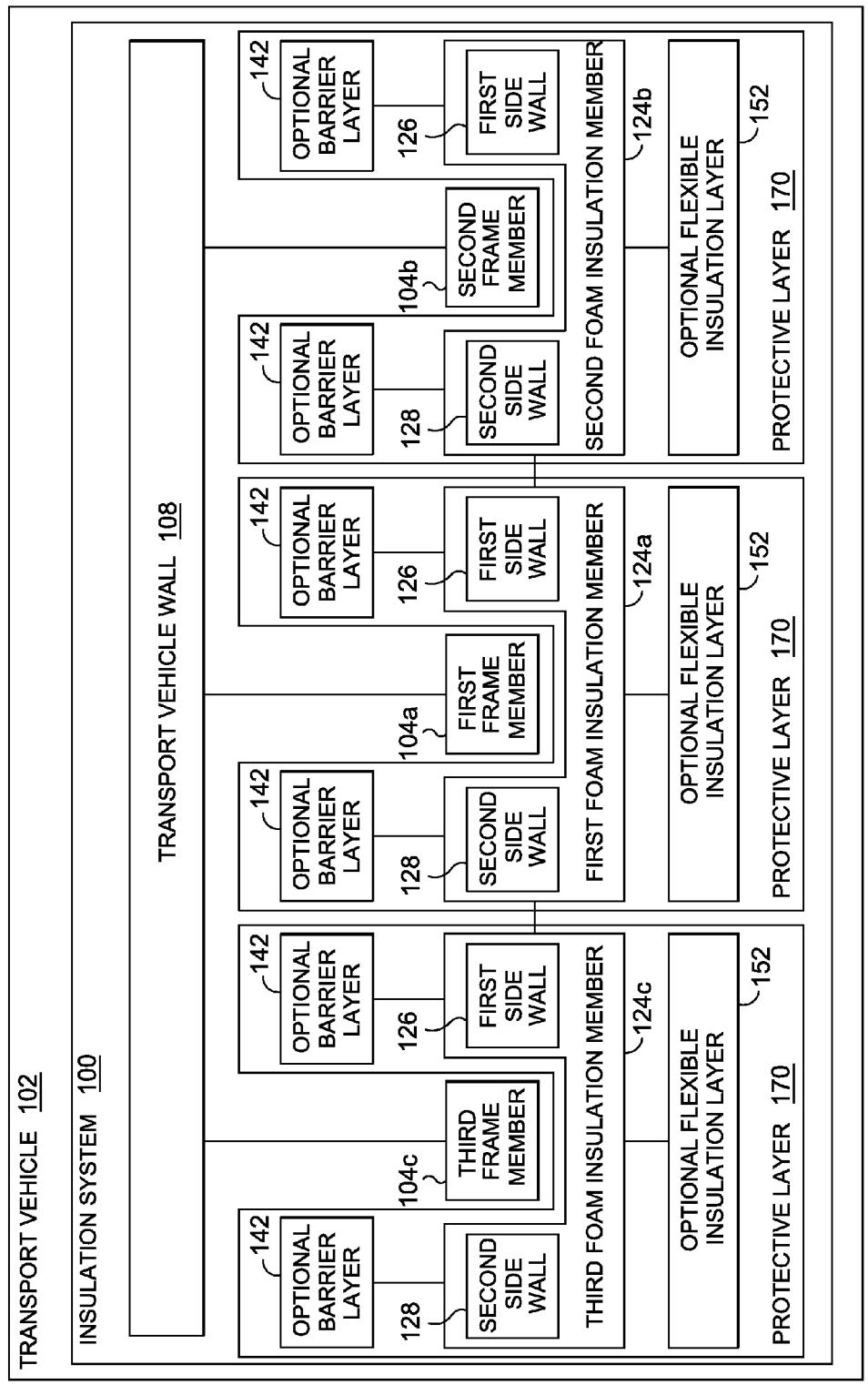
FIG. 10A is an illustration of a functional block diagram of one of the exemplary embodiments of an insulation system of the disclosure.
Figure 10B:
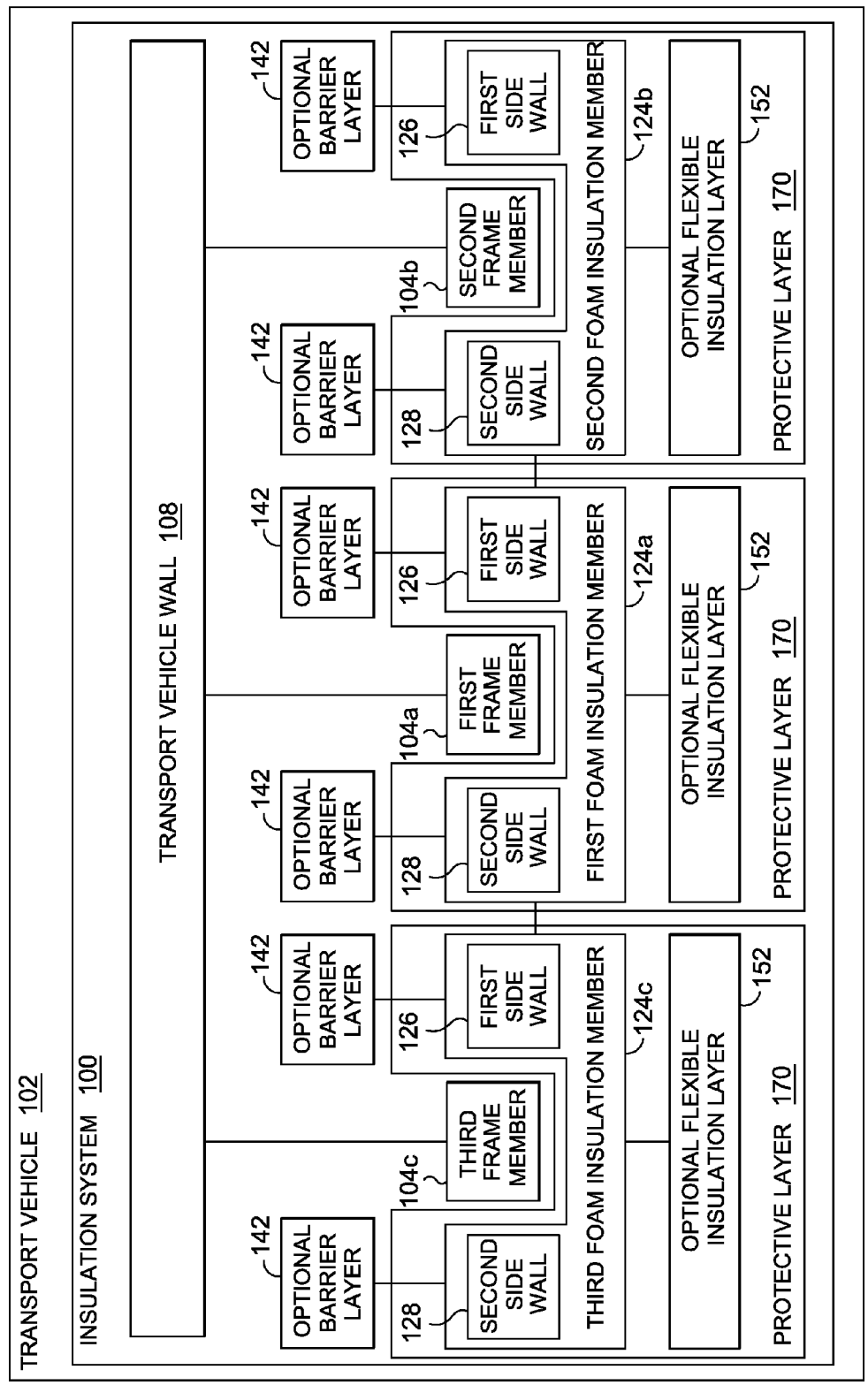
FIG. 10B is an illustration of a functional block diagram of another one of the exemplary embodiments of an insulation system of the disclosure.

FIG. 10A is an illustration of a functional block diagram of one of the exemplary embodiments of the insulation system 100 of the disclosure. FIG. 10B is an illustration of a functional block diagram of another one of the exemplary embodiments of the insulation system 100 of the disclosure. As shown in FIGS. 10A-10B, in one embodiment of the disclosure, there is provided the insulation system 100 for a transport vehicle 102. The transport vehicle 102 may comprise an aircraft 10 (see FIGS. 1, 9), an aerospace vehicle, a space launch vehicle, a rocket, a satellite, a rotorcraft, a watercraft, a boat, a train, an automobile, a truck, a bus, or another suitable transport vehicle. Preferably, the transport vehicle 102 is an aircraft 10 (see FIG. 9). As shown in FIG. 9, the insulation system 100 is shown installed in the aircraft 10. Preferably, the insulation system 100 thermally and acoustically insulates aircraft frame members 106 attached to fuselage walls 110 (see FIG. 9) of the aircraft 10.

FIGS. 5A-5D show one of the exemplary embodiments of an insulation system 100a. FIGS. 6A-6D show another one of the exemplary embodiments of an insulation system 100b. FIGS. 7A-7B shows yet another one of the exemplary embodiments of an insulation system 100c. FIGS. 8A-8D show yet another one of the exemplary embodiments of an insulation system 100d.

FIG. 5A is an illustration of a cross-sectional top view of the insulation system 100a of the disclosure. As shown in FIG. 5A, the insulation system 100a comprises one or more frame members 104. Preferably, the frame members 104 are structural frame members. In an exemplary embodiment shown in FIG. 9, the frame member 104 may comprise an aircraft frame member 106. The insulation system 100 may comprise multiple frame members 104, such as aircraft frame members 106, positioned in parallel along a length of one or more transport vehicle walls 108 (see FIG. 5A), such as a fuselage wall 110 (see FIG. 9) in a transport vehicle interior 112 (see FIG. 5A), such as an aircraft interior 114 (see FIG. 9). The frame members 104, such as, for example, aircraft frame members 106 (see FIG. 9), are preferably stiffening members that may be made of metals, such as aluminum, titanium, steel, alloys thereof, or other metals, or composite materials, such as carbon fiber reinforced plastics, aramid fiber reinforced plastics, polymer matrix composite material, polyurethanes, or other composite materials, or other suitable materials.

In one embodiment, as shown in FIGS. 5A and 10, the insulation system 100a, 100, respectively, comprises at least a first frame member 104a and a second frame member 104b. Preferably, the second frame member 104b is in a spaced relation adjacent to a first side 120 (see FIG. 5A) of the first frame member 104a. The insulation system 100a, 100, respectively, may further comprise a third frame member 104c. Preferably, the third frame member 104c is in a spaced relation adjacent to a second side 122 (see FIG. 5A) of the first frame member 104a.

As shown in FIG. 5A, the first frame member 104a, the second frame member 104b, the third frame member 104c, and any additional frame members 104 that may be used, each comprises a first free end 116 and a second end 118 attached to the transport vehicle wall 108. The first frame member 104a, the second frame member 104b, the third frame member 104c, and any additional frame members 104 each further comprises a first side 120 and a second side 122 disposed between the first free end 116 and the second end 118. The first frame member 104a, the second frame member 104b, the third frame member 104c, and any additional frame members 104 are preferably positioned in spaced relation adjacent to each other and attached to the transport vehicle wall 108 of the transport vehicle 102. The frame members 104 may be coupled or attached to the transport vehicle wall 108 via one or more known coupling elements (not shown) such as rivets (not shown), pin and collar fasteners (not shown), adhesive (not shown), or another suitable coupling element.

As shown in FIG. 5A, the insulation system 100 further comprises one or more rigid foam insulation members 124. Preferably, the rigid foam insulation members 124 are self-retaining. In one embodiment, as shown in FIGS. 5A and 10A, the insulation system 100a, 100, respectively, may comprise at least a first rigid foam insulation member 124a, and one or more additional adjacent rigid foam insulation members, such as a second rigid foam insulation member 124b and/or a third rigid foam insulation member 124c, or other additional rigid foam insulation members. Preferably, the second rigid foam insulation member 124b, when installed, is close to a first sidewall 126 of the first rigid foam insulation member 124a. Preferably, the third rigid foam insulation member 124c, when installed, is close to a second sidewall 128 of the first rigid foam insulation member 124a. In one embodiment the first, second, and third insulation members 124a, 124b, 124c, may each comprise a unitary block configuration.

As shown in FIGS. 5A and 10A, the first rigid foam insulation member 124a, the second rigid foam insulation member 124b, the third rigid foam insulation member 124c, and any additional rigid foam insulation members 124 preferably each comprises a first sidewall 126, a second sidewall 128 opposite the first sidewall 126, a first end 130, and a second end 132 opposite the first end 130. As shown in FIG. 5A, each rigid foam insulation member 124, such as the first rigid foam insulation member 124a, the second rigid foam insulation member 124b, the third rigid foam insulation member 124c, and any additional rigid foam insulation members 124 is preferably surrounded by, completely covered with, or enclosed by a protective layer 170. The protective layer 170 has an interior side 172 adjacent the exterior of the rigid foam insulation member 124 and has an exterior side 174. Preferably, the protective layer 170 is a thin, lightweight, reinforced thermal and acoustic insulation covering film which may be tightly fit around the rigid foam insulation layer 124 and may be attached to the rigid foam insulation layer 124 with an attachment device (not shown) such as tape, stitching, garment tags, a sealant or adhesive, or another suitable attachment device. The protective layer 170 may preferably comprise polymeric films, such as PEKK (polyether ketone ketone) films, PEEK (polyether ether ketone) films, PVF (polyvinyl fluoride) films, polyimide films, polyester (PET—polyethylene terephthalate) films, or another suitable polymeric film; may comprise thin plastic bagging material; or may comprise another suitable material. As shown in FIG. 5A, the first sidewall 126 of the first rigid foam insulation member 124a is close to and configured to align with, integrate with, and/or interlock with the second sidewall 128 of the second rigid foam insulation member 124b when installed, and the second sidewall 128 of the first rigid foam insulation member 124a is close to and configured to align with, integrate with, and/or interlock with the first sidewall 126 of the third rigid foam insulation member 124c when installed.

Each rigid foam insulation member 124, such as the first rigid foam insulation member 124a, the second rigid foam insulation member 124b, and the third rigid foam insulation member 124c, is preferably substantially rigid and self-retaining and may comprise an open cell foam (preferred for aircraft); a polymeric, cellular solid foam; a melamine foam; a closed cell foam; or another suitable self-retaining foam. Preferably, the rigid foam insulation member 124 has a density of from about 0.3 pounds per cubic foot to about 1.5 pounds per cubic foot. More preferably, the rigid foam insulation member 124 has a density of less than 0.4 pounds per cubic feet. Preferably, the rigid foam insulation member 124 is made of a material that is water resistant and lightweight. The rigid form insulation member 124 may comprise a foam composite insulation as disclosed in U.S. Pat. No. 7,040,575 B2, which is incorporated by reference herein in its entirety.

Figures 6A, 6B:
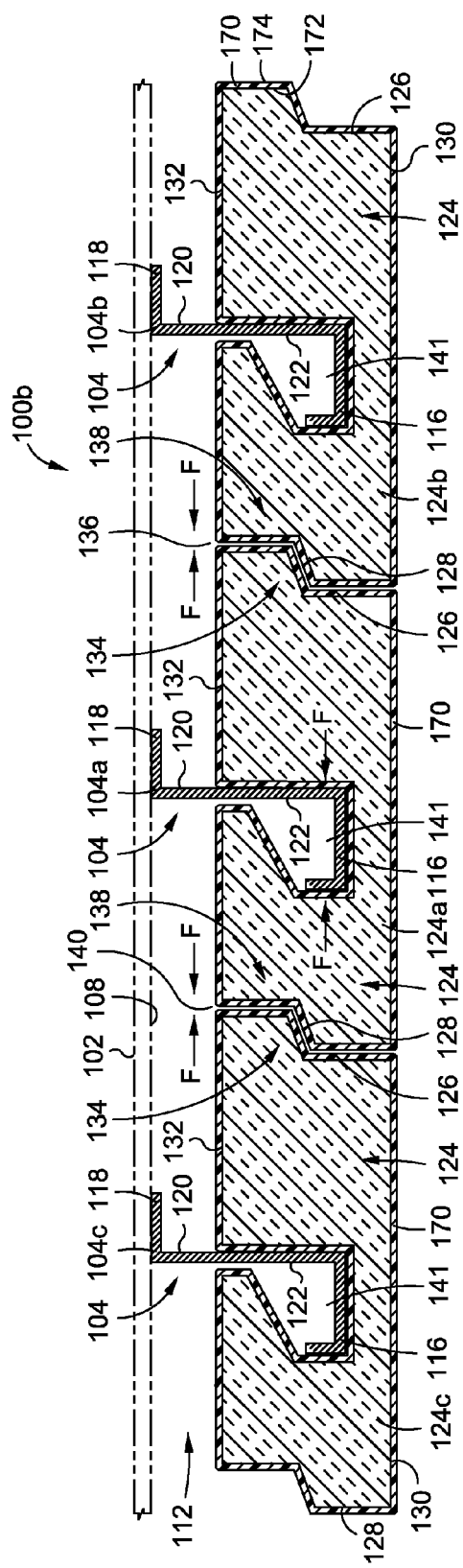
FIG. 6A is an illustration of a cross-sectional top view of another one of the exemplary embodiments of an insulation system of the disclosure.
FIG. 6B is an illustration of a cross-sectional top view showing the installation of one of the rigid foam insulation members in the insulation system of FIG. 6A.

FIG. 6A is an illustration of a cross-sectional top view of another one of the exemplary embodiments of an insulation system 100b of the disclosure. As shown in FIG. 6A, preferably, the first sidewall 126 of the first rigid foam insulation member 124a extends between the first frame member 104a and the second frame member 104b at a first position 136, and preferably, the second sidewall 128 of the first rigid foam insulation member 124a extends between the first frame member 104a and the third frame member 140c at a second position 140. The first sidewall 126 of the rigid foam insulation member 124, such as first rigid foam insulation member 124a, may be in the form of or have a first interlocking shape 134 close to and configured, when installed, to align with, integrate with, and/or interlock with a corresponding second interlocking shape 138 forming the second sidewall 128 of an adjacent rigid foam insulation member 124, such as second rigid foam insulation member 124b. When installed, the first interlocking shape 134 of the first rigid foam insulation member 124a may align with, integrate with, and/or interlock with the corresponding second interlocking shape 138 of the second rigid foam insulation member 124b at the first position 136 between two frame members 104, such as first frame member 104a and second frame member 104b. The second sidewall 128 of the rigid foam insulation member 124, such as the first rigid foam insulation member 124a, may be in the form of or may have the second interlocking shape 138 close to and configured, when installed, to align with, integrate with, and/or interlock with the first interlocking shape 134 forming the first sidewall 126 of another adjacent rigid foam insulation member 124, such as third rigid foam insulation member 124c. When installed, the second interlocking shape 138 of the first rigid foam insulation member 124a may align with, integrate with, and/or interlock with the first interlocking shape 134 of the third rigid foam insulation member 124c at the second position 140 between two frame members 104, such as first frame member 104a and third frame member 104c. The first and second interlocking shapes 134, 138 may be shaped in varying corresponding configurations designed to interlock or integrate the rigid foam insulation members 124 in compression fit against each other.

FIG. 7A is an illustration of a cross-sectional top view of one of the exemplary embodiments of an insulation system 100c of the disclosure having rigid foam insulation members 124 comprised of two portions being of different materials. FIG. 7B is an illustration of a cross-sectional top view of the insulation system of FIG. 7A having rigid foam insulation members 124 comprised of two portions being of the same material. As shown in FIGS. 7A, 7B, each of the rigid foam insulation members 124, such as first rigid foam insulation member 124a, second rigid foam insulation member 124b, and third rigid foam insulation member 124c, may be comprised of two or more separate portions or pieces, such as a first portion 162 that is designed to correspond, interlock, or integrate with a second portion 164. An advantage of having each rigid foam insulation member 124 comprised of two or more portions or pieces may allow for greater ease of installation of the insulation foam member 124 around the frame member 104 and against adjacent foam insulation members 124. Another advantage may allow for installation of wires, trim panels, or other components or structures that may have to be installed around or between the frame members 104 and the rigid foam insulation members 124 or between the rigid foam insulation members 124 and the transport vehicle interior 112 (see FIG. 5A, 6A). Alternatively, one-piece or unitary rigid foam insulation members 124 (see FIGS. 5A, 6A) may be manually cut or machine cut at various portions or areas on the rigid foam insulation member 124 in order to allow for space between the foam insulation member 124 and the frame member 104 or space between the foam insulation member 124 and the transport vehicle interior 112 (see FIGS. 5A, 6A) to allow for installation of wires. The first portion 162 may be made of the same material or a different material than the second portion 164. As shown in FIG. 7A, the rigid foam insulation members 124 are comprised of first portion 164 made of a first material 166 and second portion 162 made of a different second material 168. As shown in FIG. 7B, the rigid foam insulation members 124 are comprised of first portion 164 made of first material 166 and second portion 162 made of the same first material 166. The use of rigid foam insulation members 124 made of two different materials may be used to allow for greater flexibility of the rigid foam insulation members 124 to install or wrap around the frame member 104 and/or may be used to tailor the acoustic or thermal performance of the insulation system. The first sidewall 126 of each of the rigid foam insulation members 124, such as first rigid foam insulation member 124a, second rigid foam insulation member 124b, and third rigid foam insulation member 124c, may form the first sidewall 126 of the second portion 164, and the second sidewall 128 of each of the rigid foam insulation members 124, such as first rigid foam insulation member 124a, second rigid foam insulation member 124b, and third rigid foam insulation member 124c, may form the second sidewall 128 of the first portion 162. As shown in FIGS. 7A, 7B, when installed, the first sidewall 126 of the second portion 164 of the first rigid foam insulation member 124a is preferably close to and configured to align with, integrate with, and/or interlock with the second sidewall 128 of the first portion 162 of the second rigid foam insulation member 124b. As further shown in FIGS. 7A, 7B, when installed, the second sidewall 128 of the first portion 162 of the first rigid foam insulation member 124a is preferably close to and configured to align with, integrate with, and/or interlock with the first sidewall 126 of second portion 164 of the third rigid foam insulation member 124c.

As shown in FIGS. 5A, 6A, 7, 8A the rigid foam insulation member 124, such as the first rigid foam insulation member 124a, the second rigid foam insulation member 124b, the third rigid foam insulation member 124c, and any additional rigid foam insulation members 124, preferably each further comprises at least one open portion 141 designed to substantially extend over, cover, or encase a frame member 104. Preferably, the open portion 141 of the rigid foam insulation member 124 extends over, covers, or encases the first free end 116 and substantial portions of the first side 120 and the second side 122 of the frame member 104.

FIG. 5B is an illustration of a cross-sectional top view showing the installation of one of the foam insulation members 124 in the insulation system 100a of FIG. 5A. As shown in FIG. 5B, the open portion 141 of the rigid foam insulation member 124, such as, for example the first rigid foam insulation member 124a, may be maneuvered or adjusted in direction d to extend over, cover, or encase the first free end 116 and substantial portions of the first side 120 and the second side 122 of the first frame member 104a.

FIG. 6B is an illustration of a cross-sectional top view showing the installation of one of the foam insulation members 124 in the insulation system 100b of FIG. 6A. As shown in FIG. 6B, the open portion 141 of the rigid foam insulation member 124, such as, for example the first rigid foam insulation member 124a, may be maneuvered or adjusted in direction d to extend over, cover, or encase the first free end 116 and substantial portions of the first side 120 and the second side 122 of the first frame member 104a.

FIG. 8B is an illustration of a cross-sectional top view showing the installation of one of the rigid foam insulation members 124 in the insulation system 100d of FIG. 8A. As shown in FIG. 8B, the open portion 141 of the rigid foam insulation member 124, such as, for example the first rigid foam insulation member 124a, may be maneuvered or adjusted in direction d to extend over, cover, or encase the first free end 116 and substantial portions of the first side 120 and the second side 122 of the first frame member 104a.

Figure 3:
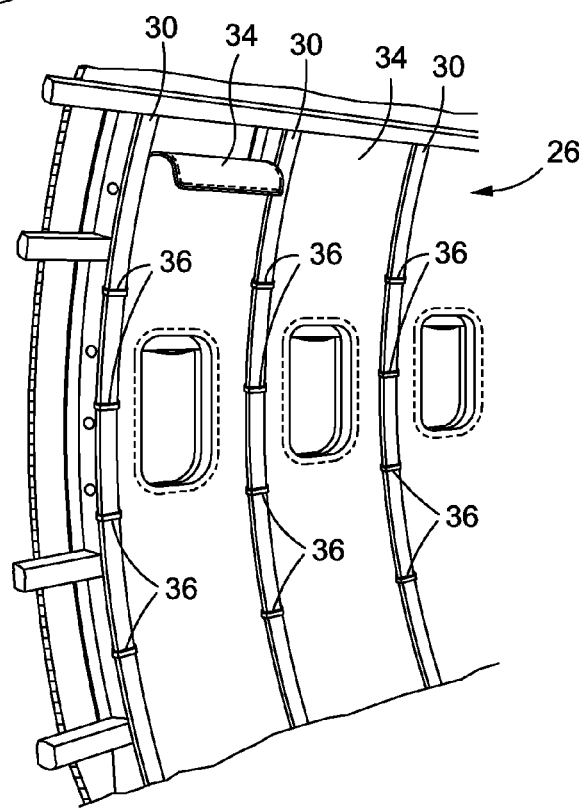
FIG. 3 is an illustration of a partial front perspective view of the aircraft fuselage interior of FIG. 2 showing a known insulation blanket secured with known fastener devices.

As shown in FIGS. 5A, 6A, 7, 8A, when installed, the first rigid foam insulation member 124a is preferably held between adjacent second rigid foam insulation member 124b and adjacent third rigid foam insulation member 124c by compression force ←F from the second rigid foam insulation member 124b and compression force F→ from the third rigid foam insulation member 124c, where each of the rigid foam insulation members are covered by a protective layer 170. When the first, second, and third rigid foam insulation members 124a, 124b, 124c, respectively, are integrated, the second rigid foam insulation member 124b may impart or exert one or more compression forces ←F on and against the first sidewall 126 of the first rigid foam insulation member 124a and may impart or exert one or more compression forces ←F on and against the first side 120 of the first frame member 104a. Thus, the second rigid foam insulation member 124b may impart or exert one or more compression forces ←F on and against the first rigid foam insulation member 124a and the first frame member 104a in order to compression fit and secure the first rigid foam insulation member 124a in place without use of any fastener device 36 (see FIG. 3), such as clip fasteners 38 (see FIGS. 4A-4B).

Similarly, when the first, second, and third rigid foam insulation members 124a, 124b, 124c, respectively, are integrated, the third rigid foam insulation member 124c may impart or exert one or more compression forces F→ on and against the second sidewall 128 of the first rigid foam insulation member 124a and may impart or exert one or more compression forces F→ on and against the second side 122 of the first frame member 104a. Thus, the third rigid foam insulation member 124c may impart or exert one or more compression forces F→ on and against the first rigid foam insulation member 124a and the first frame member 104a in order to compression fit and secure the first rigid foam insulation member 124a in place without use of any fastener device 36 (see FIG. 3), such as clip fasteners 38 (see FIGS. 4A-4B).

Figure 4A:
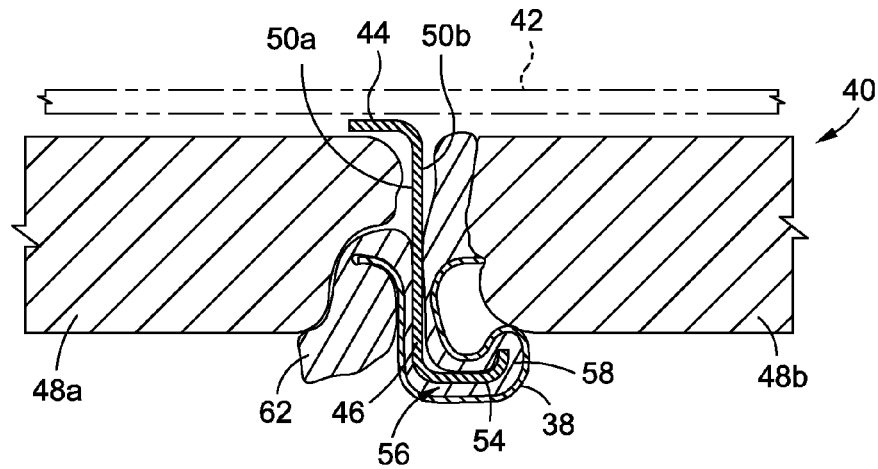
FIG. 4A is an illustration of a cross-sectional top view of a portion of a known aircraft fuselage interior with a known clip fastener installed.
Figure 4B:
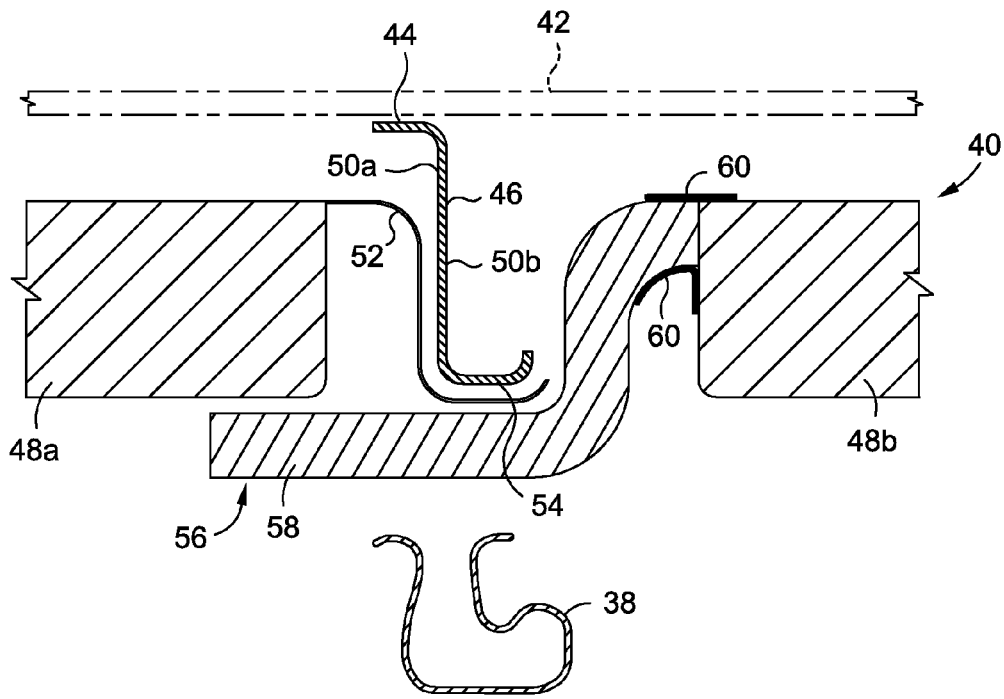
FIG. 4B is an illustration of a cross-sectional top exploded view of the known aircraft fuselage interior and clip fastener of FIG. 4A.

In addition, when the first, second, and third rigid foam insulation members 124a, 124b, 124c, respectively, are integrated, the first insulation member 124a may impart or exert one or more compression forces F→ on and against the second rigid foam insulation member 124b and on and against the second frame member 104b in order to compression fit and secure the second rigid foam insulation member 124b in place without use of any fastener device 36 (see FIG. 3), such as clip fasteners 38 (see FIGS. 4A-4B). Similarly, when the first, second, and third rigid foam insulation members 124a, 124b, 124c, respectively, are integrated, the first rigid foam insulation member 124*a* may impart or exert one or more compression forces ←F on and against the third rigid foam insulation member 124*c* and on and against the third frame member 104*c* in order to compression fit and secure the third rigid foam insulation member 124*c* in place without use of any fastener device 36 (see FIG. 3), such as clip fasteners 38 (see FIGS. 4A-4B). By reciprocity, the first insulation member 124*a* is preferably compression fit and secured in place without use of any fastener device 36 (see FIG. 3), such as clip fasteners 38 (see FIGS. 4A-4B) by the one or more compression forces F→ imparted by third foam insulation member 124*c*, the one or more compression forces ←F imparted by second foam insulation member 124*b*, and the resulting compression forces F→ and ←F due to the fit around the first frame member 104*a*.

As shown in FIGS. 5C-5D, 6C-6D, 8C-8D, and 10A-10B, the insulation system 100*a*, 100*b*, 100*d*, 100, respectively, may optionally further comprise a barrier layer 142. In one embodiment, as shown in FIGS. 5C, 6C, 8C and 10A, the barrier layer 142 is coupled to or wrapped over one or more portions of the second end 132 of the rigid foam insulation member 124, such as, the first, second, and third rigid foam insulation members 124*a*, 124*b*, 124*c*, respectively, and the barrier layer 142 may be inside of or within the protective layer 170. Preferably, in this embodiment, the barrier layer 142 is positioned between the second end 132 of the rigid foam insulation member 124 and the interior side 172 of the protective layer 170. FIG. 5C is an illustration of a cross-sectional top view of the insulation system 100*a* of FIG. 5A showing the barrier layer 142 inside of the protective layer 170. FIG. 6C is an illustration of a cross-sectional top view of the insulation system 100*b* of FIG. 6A having the barrier layer 142 inside of the protective layer 170. FIG. 8C is an illustration of a cross-sectional top view of the insulation system 100*d* of FIG. 8A having the barrier layer 142 inside of the protective layer 170.

In another embodiment, as shown in FIGS. 5D, 6DC, 8D and 10B, the barrier layer 142 is coupled to or wrapped over one or more portions of the exterior side 174 of the protective layer 170, and the barrier layer 142 is outside of the protective layer 170 and outside of the rigid foam insulation member 124. Preferably, in this embodiment, the barrier layer 142 is positioned between the exterior side 174 of the protective layer 170 and the transport vehicle wall 108 of the transport vehicle 102. FIG. 5D is an illustration of a cross-sectional top view of the insulation system of FIG. 5A having the barrier layer 142 outside of the protective layer 170. FIG. 6D is an illustration of a cross-sectional top view of the insulation system 100*b* of FIG. 6A having the barrier layer 142 outside of the protective layer 170. FIG. 8D is an illustration of a cross-sectional top view of the insulation system 100*d* of FIG. 8A having the barrier layer 142 outside of the protective layer 170. As shown in FIGS. 5C-5D, 6C-6D, 8C-8D, the barrier layer 142 preferably comprises a first side 144, a second side 146, a first end 148, and a second end 150. As shown in FIGS. 5C, 6C, 8C, the first side 144 of the barrier layer 142 may be coupled to one or more portions of the second end 132 of the rigid foam insulation member 124, and the second side 146 of the barrier layer 142 may be coupled to the interior side 172 of the protective layer 170. A shown in FIGS. 5D, 6D, 8D, the first side 144 of the barrier layer 142 may be coupled to one or more portions of the exterior side 174 of the protective layer 170, and the second side 146 of the barrier layer 142 may be exposed or open to the transport vehicle interior 112 opposite and/or adjacent to the transport vehicle wall 108. With the embodiment shown in FIGS. 5C, 6C, 8C, the barrier layer 142 may be coupled to the rigid foam insulation member 124 via the protective layer 170 (see FIGS. 5C, 6C, 8C and 10A) which is designed to fit snugly around the barrier layer 142 and the rigid foam insulation member 124 and hold the barrier layer 142 in place against the rigid foam insulation member 124. Alternatively, with the embodiment shown in FIGS. 5C, 6C, 8C, the barrier layer 142 may be coupled to the rigid foam insulation member 124 via one or more coupling members (not shown), such as a glue or adhesive (not shown), adhesive tape (not shown), hook and loop tape (not shown), stitching (not shown), garment tags (not shown) or another suitable coupling member. With the embodiment shown in FIGS. 5D, 6D, 8D, the barrier layer 142 may be coupled to the protective layer 170 via one or more coupling members (not shown), such as a glue or adhesive (not shown), adhesive tape (not shown), hook and loop tape (not shown), or another suitable coupling member. The barrier layer 142 preferably is a lightweight, flexible, and strong material that may comprise one or more of the following: a flame penetration resistant barrier material that can withstand a direct flame as required to meet FAA (Federal Aviation Administration) burn-through requirements, for example, ceramic fiber paper; an acoustic barrier material that provides improved acoustic performance, for example, fiberglass insulation, foam insulation such as polyimide or melamine, or nonwoven material such as meta-aramid felt; a thermal barrier material that provides improved thermal performance, for example, felt or fiberglass; a water repellant barrier material that prevents water penetration, for example, hydrophobic treated fiberglass insulation, hydrophobic treated open cell foam insulation such as polyimide or melamine foam, hydrophically treated nonwoven material such as meta-aramid felt, or closed cell foam; or another suitable barrier material. In another exemplary embodiment, the insulation system 100*a*, 100*b*, 100*d*, 100, may comprise a barrier layer 142 positioned or wrapped over one or more portions of each of multiple integrated rigid foam insulation members 124 positioned in parallel along a length of one or more transport vehicle walls 108 in a transport vehicle interior 112 or positioned or wrapped over one or more portions of the protective layer 170 surrounding each of multiple integrated rigid foam insulation members 125 positioned in parallel along a length of one or more transport vehicles walls 108 in a transport vehicle interior 112.

As shown in FIGS. 10A-10B and FIGS. 8A-8D, the insulation system 100, 100*d*, respectively, may optionally further comprise a flexible insulation layer 152 coupled to or wrapped over one or more portions of the first end 130 of the rigid foam insulation member 124, such as, the first, second, and third insulation members 124*a*, 124*b*, 124*c*, respectively. As shown in FIGS. 8A-8D, the flexible insulation layer 152 comprises a first side 154, a second side 156, a first end 158, and a second end 160. The second side 156 of the flexible insulation layer 152 may be coupled to one or more portions of the first end 130 of the rigid foam insulation member 124, and the first side 154 of the flexible insulation layer 152 may be coupled to the interior side 172 of the protective layer 170. The flexible insulation layer 152 may be coupled to the rigid foam insulation member 124 via the protective layer 170 (see FIGS. 8A-8D) which is designed to fit snugly around the flexible insulation layer 152 and the rigid foam insulation member 124 and hold the flexible insulation layer 152 in place against the rigid foam insulation member 124. Alternatively, the flexible insulation layer 152 may be coupled or attached to the rigid foam insulation member 124 via one or more attachment members (not shown), such as a glue or adhesive (not shown), adhesive tape (not shown), hook and loop tape (not shown), stitching (not shown), garment tags (not shown) or another suitable attachment member. The barrier layer 142 preferably is a lightweight, flexible, and strong material that may comprise In another exemplary embodiment, the insulation system 100a, 100b, 100d, 100, may comprise a barrier layer 142 positioned or wrapped over one or more portions of each of multiple integrated rigid foam insulation members 124 positioned in parallel along a length of one or more transport vehicle walls 108 in a transport vehicle interior 112 or positioned or wrapped over one or more portions of the.

Preferably, the flexible insulation layer 152 comprises a lightweight, flexible, and strong material that may comprise one or more of the following a flame penetration resistant barrier material that can withstand a direct flame as required to meet FAA (Federal Aviation Administration) burn-through requirements, for example, ceramic fiber paper; an acoustic barrier material that provides improved acoustic performance, for example, fiberglass insulation, foam insulation such as polyimide or melamine, or nonwoven material such as meta-aramid felt; a thermal barrier material that provides improved thermal performance, for example, felt or fiberglass; a water repellant barrier material that prevents water penetration, for example, hydrophobic treated fiberglass insulation, hydrophobic treated open cell foam insulation such as polyimide or melamine foam, hydrophically treated nonwoven material such as meta-aramid felt, or closed cell foam; or another suitable flexible insulation material. Preferably, with respect to aircraft, the flexible insulation layer is designed to insulate against temperatures experienced during aircraft operation. In another exemplary embodiment, the insulation system 100d may comprise a flexible insulation layer 152 positioned or wrapped over one or more portions of each of multiple integrated rigid foam insulation members 124 positioned in parallel along a length of one or more transport vehicle walls 108 in a transport vehicle interior 112.

FIG. 9 is an illustration of a partial front perspective view of the insulation system 100 of the disclosure installed in an aircraft 10. As shown in FIG. 9, the insulation system 100 may have frame members 104 comprising first and second aircraft frame members 106 in adjacent attachment to a fuselage wall 110 of an aircraft 10. Preferably, the insulation system 100 comprises multiple aircraft frame members 106 attached in parallel along a length of one or more fuselage walls 110. As further shown in FIG. 9, the insulation system 100 further comprises multiple rigid foam insulation members 124, such as a first rigid foam insulation member 124a having a first sidewall 126 and a second sidewall 128, a second rigid foam insulation member 124b having a first sidewall 126 and a second sidewall 128, and a third rigid foam insulation member 124c having a first sidewall 126 and a second sidewall 128 (see FIGS. 10A-10B). Preferably, each of the rigid foam insulation members 124, such as the first rigid foam insulation member 124a, the second rigid foam insulation member 124b, and the third rigid foam insulation member 124c is surrounded by, completely covered with, or enclosed by a protective layer 170. The details of the rigid foam insulation members 124 and protective layer 170 are discussed above and are applicable to this embodiment. The first rigid foam insulation member 124a preferably extends to a first position 136 (see FIG. 6A) between the first and second aircraft frame members 106a, 106b. The first sidewall 126 of the first rigid foam insulation member 124a is preferably configured to integrate with the second sidewall 128 of the second rigid foam insulation member 124b. The second sidewall 128 of the first rigid foam insulation member 124a is preferably configured to integrate with the first sidewall 126 of the third rigid foam insulation member 124c. Preferably, each aircraft frame member 106 is substantially covered or encased by the rigid foam insulation member 124. Preferably, each rigid foam insulation member 124, such as, for example, the first rigid foam insulation member 124a, is secured in place by the integrated adjacent rigid foam insulation members 124, such as, for example, the second rigid foam insulation member 124b and the third rigid foam insulation member 124c, disposed in compression fit against each other and against the aircraft frame members 106. When the first, second, and third rigid foam insulation members 124a, 124b, 124c, are integrated, the second and third rigid foam insulation members 124b, 124c, respectively, may exert or impart one or more compression forces ←F, F→ on the first rigid foam insulation member 124a and on the first aircraft frame member 106a in order to secure the first rigid foam insulation member 124a in place without use of any fastener device 36 (see FIG. 3), such as clip fasteners 38 (see FIGS. 4A-4B).

The insulation system 100 installed in the aircraft 10 may optionally further comprise the barrier layer 142 (see FIGS. 5C-5D, 6C-6D, 8C-8D) that in one embodiment (see FIGS. 5C, 6C, 8C) may be coupled to one or more portions of the first, second, and third rigid foam insulation members 124a, 124b, 124c and positioned between the one or more rigid foam insulation members 124a, 124b, 124c and the interior side 172 of the protective layer 170, and that in another embodiment (see FIGS. 5D, 6D, 8D) may be coupled to one or more portions of the exterior side 174 of the protective layer 170 and positioned between the outside of the protective layer 170 and the fuselage wall 110 of the aircraft 10. The details of the barrier layer 142 are discussed above and are applicable to this embodiment. The insulation system 100 installed in the aircraft 10 may optionally further comprise a flexible insulation layer 152 (see FIGS. 8A-8D) that may be coupled to one or more portions of the first, second, and third rigid foam insulation members 124a, 124b, 124c. The details of the flexible insulation layer 152 are discussed above and are applicable to this embodiment. In another embodiment, one or more of the first, second, and third rigid foam insulation members 124a, 124b, 124c of the insulation system 100 installed in the aircraft 10 may be comprised of two or more portions or pieces, such as shown in FIG. 7A where a first portion 164 is made of a first material 166 and a second portion 162 is made of a different second material 168, or such as shown in FIG. 7B where the first portion 164 and the second portion 162 are made of the same first material 166.

Figure 11:
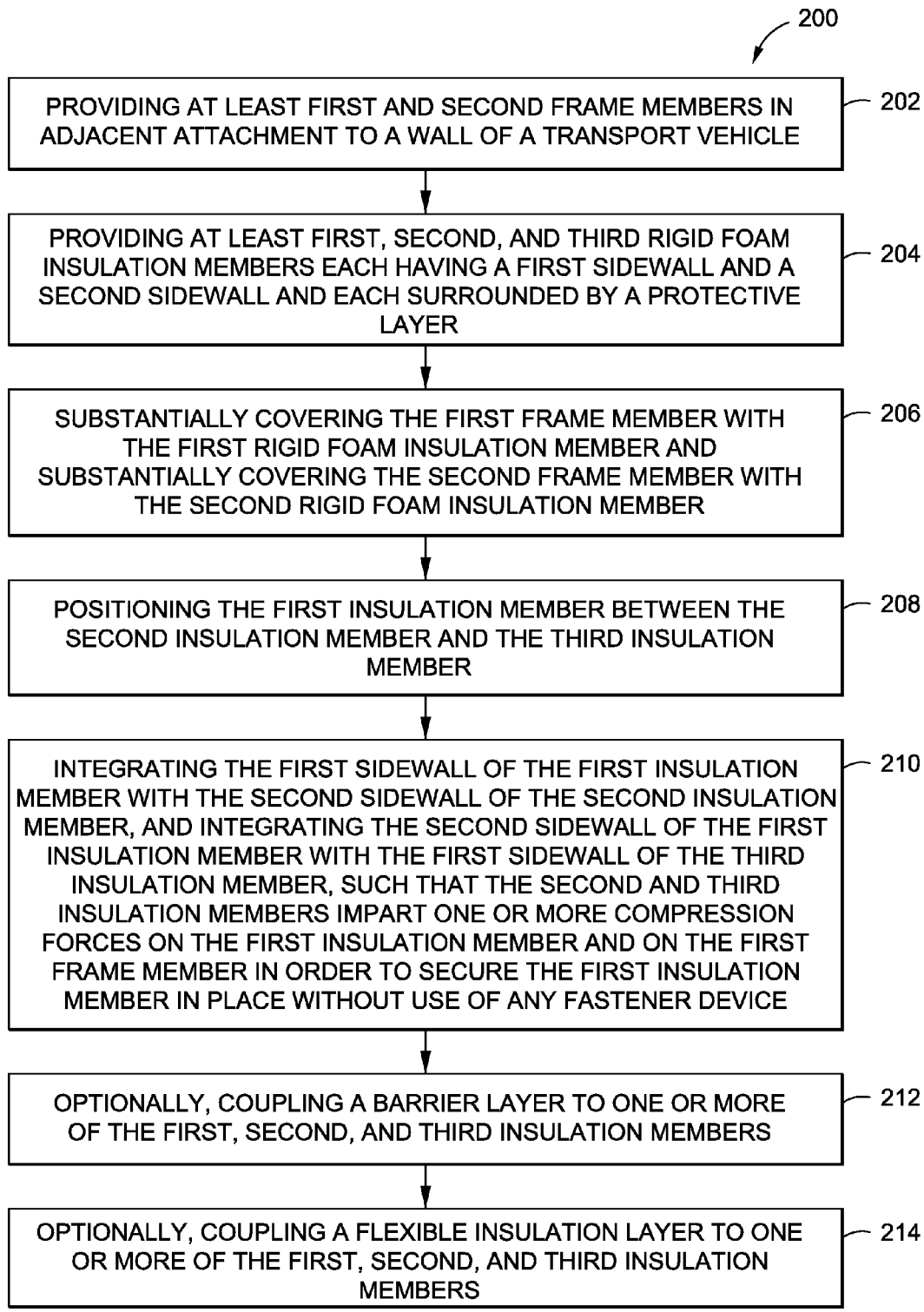
FIG. 11 is an illustration of a flow diagram of one of the exemplary embodiments of an insulation method of the disclosure; and, FIG. 12 is an illustration of a flow diagram of another one of the exemplary embodiments of an insulation method of the disclosure.

In another embodiment of the disclosure, there is provided a method 200 of insulating a frame member 104 of a transport vehicle 102. FIG. 11 is an illustration of a flow diagram of one of the exemplary embodiments of the insulation method 200 of the disclosure. The transport vehicle 102 may comprise an aircraft 10 (see FIGS. 1, 9), an aerospace vehicle, a space launch vehicle, a rocket, a satellite, a rotorcraft, a watercraft, a boat, a train, an automobile, a truck, a bus, or another suitable transport vehicle. The method 200 may use at least one of the embodiments of the insulation system 100, 100a, 100b, 100c, 100d. The details of the insulation system 100, 100a, 100b, 100c, 100d are discussed above and are applicable to this embodiment.

The method 200 comprises step 202 of providing at least first and second frame members 104a, 104b in adjacent attachment to a transport vehicle wall 108 of a transport vehicle 102 (see FIGS. 5A, 6A, 7A, 8A, 10A). The method 200 further comprises step 204 of providing at least first, second, and third rigid foam insulation members 124a, 124b, 124c each having a first sidewall 126 and a second sidewall 128 (see FIGS. 5A, 6A, 7A, 8A, 10A) and each first, second, and third rigid foam insulation member 124a, 124b, 124c being surrounded by a protective layer 170 (see FIGS. 5A, 6A, 7A, 8A, 10A). The method 200 further comprises step 206 of substantially covering the first frame member 104a with the first rigid foam insulation member 124a and substantially covering the second frame member 104b with the second rigid foam insulation member 124b. The method 200 further comprises step 208 of positioning the first rigid foam insulation member 124a between the second rigid foam insulation member 124b and the third rigid foam insulation member 124c. The method 200 further comprises step 210 of integrating the first sidewall 126 of the first rigid foam insulation member 124a with the second sidewall 128 of the second rigid foam insulation member 124b, and integrating the second sidewall 128 of the first rigid foam insulation member 124a with the first sidewall 126 of the third rigid foam insulation member 124c, such that the second and third rigid foam insulation members 124b, 124c, respectively, exert or impart one or more compression forces ←F, F→, respectively, (see FIGS. 5A, 6A, 7, 8A) on the first rigid foam insulation member 124a and on the first frame member 104a in order to secure the first rigid foam insulation member 124a in place without use of any fastener device 36 (see FIG. 3) such as clip fasteners 38 (see FIGS. 4A-4B).

The method 200 may further comprise optional step 212 of coupling a barrier layer 142 (FIGS. 5C-5D, 6C-6D, 8C-8D), that in one embodiment (see FIGS. 5C, 6C, 8C), may be coupled to one or more portions of the first, second, and third rigid foam insulation members 124a, 124b, 124c, and positioned between the first, second, and third rigid foam insulation members 124a, 124b, 124c and the interior side 172 of the protective layer 170, and that in another embodiment (see FIGS. 5D, 6D, 8D), may be coupled to one or more portions of the exterior side 174 of the protective layer 170 and positioned between the outside of the protective layer 170 and the transport vehicle wall 108 of the transport vehicle 102. The method 200 may further comprise optional step 214 of coupling a flexible insulation layer 152 (FIGS. 8A-8D) to one or more portions of the first, second, and third rigid foam insulation members 124a, 124b, 124c. The details of the barrier layer 142 and the flexible insulation layer 152 are discussed above and are applicable to this method embodiment.

Figure 12:
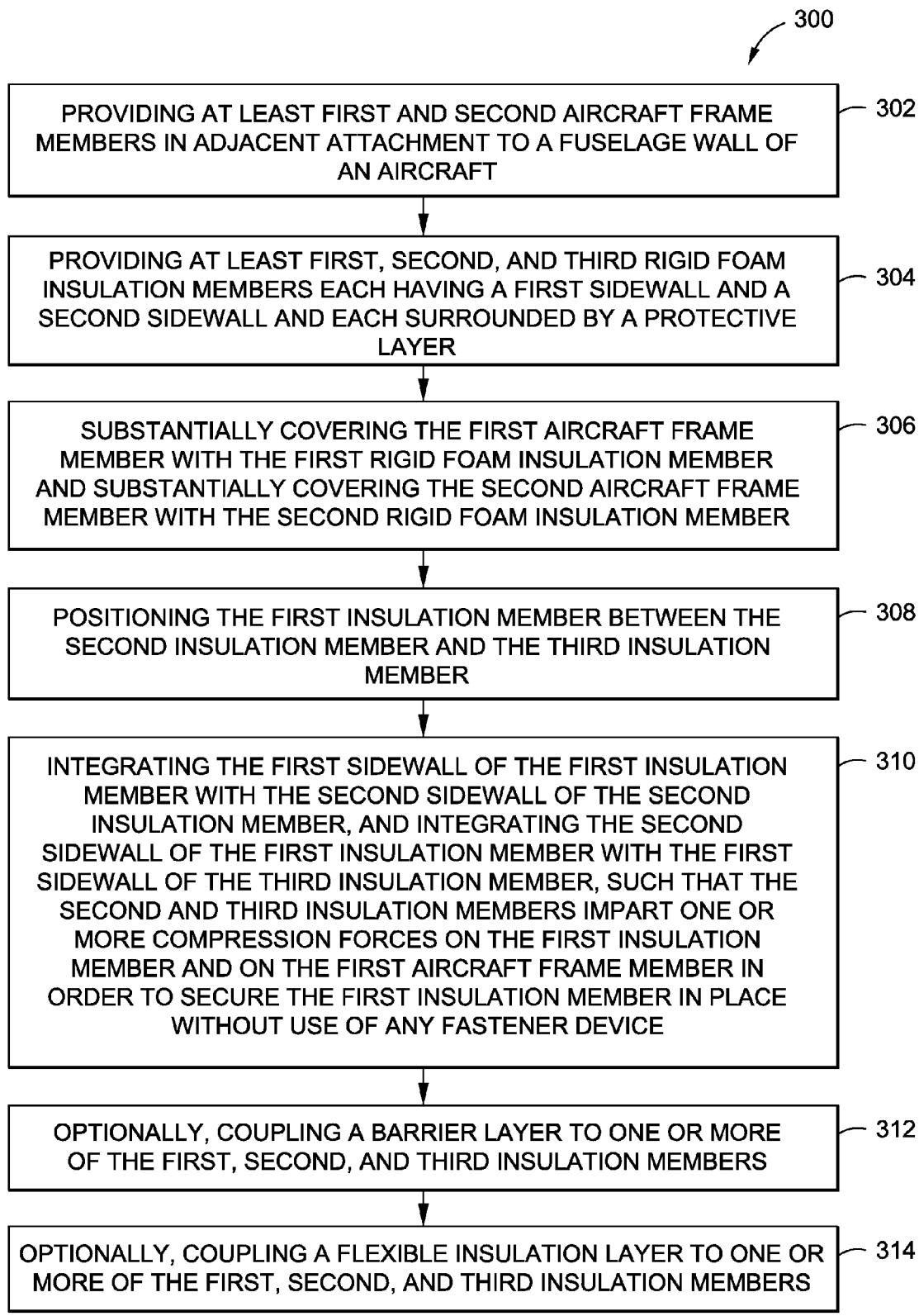

In another embodiment of the disclosure, there is provided a method 300 of insulating an aircraft frame member 106 (see FIG. 9) of an aircraft 10. FIG. 12 is an illustration of a flow diagram of one of the exemplary embodiments of the insulation method 300 of the disclosure. The method 300 may use at least one of the embodiments of the insulation system 100, 100a, 100b, 100c, 100d or another suitable embodiment. The details of the insulation system 100, 100a, 100b, 100c, 100d are discussed above and are applicable to this method embodiment.

The method 300 comprises step 302 of providing a plurality of frame members 104 (see FIGS. 10A-10B) and at least first and second aircraft frame members 106a, 106b (see FIG. 9) in adjacent attachment to a fuselage wall 110 (see FIG. 9) of an aircraft 10. The method 300 further comprises step 304 of providing a plurality of rigid foam insulation members 124 and at least first, second, and third rigid foam insulation members 124a, 124b, 124c (see FIG. 9), each having a first sidewall 126 and a second sidewall 128 (see FIG. 9), and each first, second, and third rigid foam insulation member 124a, 124b, 124c being surrounded by a protective layer 170 (see FIG. 9). The method 300 further comprises step 306 of substantially covering the first aircraft frame member 106a with the first rigid foam insulation member 124a (see FIG. 9) and substantially covering the second aircraft frame member 106b with the second rigid foam insulation member 124b (see FIG. 9). The method 300 further comprises step 308 of positioning the first rigid foam insulation member 124a between the second rigid foam insulation member 124b and the third rigid foam insulation member 124c. The method 300 further comprises step 310 of integrating the first sidewall 126 (see FIG. 9) of the first rigid foam insulation member 124a with the second sidewall 128 (see FIG. 9) of the second rigid foam insulation member 124b, and integrating the second sidewall 128 (see FIG. 9) of the first rigid foam insulation member 124a with the first sidewall 126 (see FIG. 9) of the third rigid foam insulation member 124c, such that the second and third rigid foam insulation members 124b, 124c, respectively, exert or impart one or more compression forces ←F, F→, respectively, (see FIG. 9) on the first rigid foam insulation member 124a and on the first aircraft frame member 106a in order to secure the first rigid foam insulation member 124a in place without use of any fastener device 36 (see FIG. 3) such as clip fasteners 38 (see FIGS. 4A-4B).

The method 300 may further comprise optional step 312 of coupling a barrier layer 142 (see FIGS. 5C-5D, 6C-6D, 8C-8D), that in one embodiment (see FIGS. 5C, 6C, 8C), may be coupled to one or more portions of the first, second, and third rigid foam insulation members 124a, 124b, 124c and positioned between the first, second, and third rigid foam insulation members 124a, 124b, 124c and the interior side 172 of the protective layer 170, and that in another embodiment (see FIGS. 5D, 6D, 8D), may be coupled to one or more portions of the exterior side 174 of the protective layer 170 and positioned between the outside of the protective layer 170 and the fuselage wall 110 of the aircraft 10. The method 300 may further comprise optional step 314 of coupling a flexible insulation layer 152 (see FIGS. 8A-8D) to one or more portions of the first, second, and third rigid foam insulation members 124a, 124b, 124c. The details of the barrier layer 142 and the flexible insulation layer 152 are discussed above and are applicable to this method embodiment.

Embodiments of the insulation system 100, 100a-100d and insulation method 200, 300 provide integrated rigid foam insulation members 124 (see FIGS. 5A-9), preferably in the form of integrated insulation blocks, that thermally and acoustically insulate frame members 104 (see FIGS. 5A-8C), such as aircraft frame members 106 (see FIG. 9), of a transport vehicle 102 (see FIG. 5A), such as an aircraft 10 (see FIG. 9), aerospace vehicles, space launch vehicles, rockets, satellites, rotorcraft, watercraft, boats, trains, automobiles, trucks, buses, and other suitable transport vehicles. Embodiments of the insulation system 100, 100a-100d and insulation method 200, 300 provide an integrated insulation block configuration designed to be self-supporting once installed on the frame member 104, such as the aircraft frame member 106, by means of encapsulating the frame member 104, such as the aircraft frame member 106, of the transport vehicle 102, such as the aircraft 10, and by wedging and compressing between the frame members 104, such as the aircraft frame members 106, of the transport vehicle 102, such as the aircraft 10.

Embodiments of the insulation system 100, 100a-100d and insulation method 200, 300 take advantage of the rigid or stiff nature of the self-retaining or self-supporting foam insulation members or insulation blocks that can substantially extend over, cover, or encase the frame member and that can compression-fit between the frame members of the transport vehicle structure, such as the aircraft frame members, of the aircraft fuselage or body, to provide a means to insulate the frame members or aircraft frame members themselves. Embodiments of the insulation system 100, 100a-100d and insulation method 200, 300 provide rigid foam insulation members 124 (see FIGS. 5A-9), preferably in the form of integrated insulation blocks, that have sidewall shapes that interlock to form a compressive fit between two adjacent rigid foam insulation members 124 and the frame member 104, the rigid foam insulation member 124 covering the frame member 104 itself. The sidewalls 126, 128 (see, for example, FIG. 6A) of the rigid foam insulation members 124 preferably have connective or interlocking features to exert or impart a sidewall load, such as one or more compression forces ←F, F→, on the rigid foam insulation member 124 and on the frame member 104 in order to secure the rigid foam insulation member 124 in place without use of any fastener device, such as clip fasteners.

The integrated rigid foam insulation member design or integrated insulation block design insulates simultaneously the aircraft's skin and stiffeners which decreases the risk of acoustic leakage or thermal leakage into the aircraft. The integrated rigid foam insulation member design or integrated insulation block design is preferably designed to remain in place for the entire life of an aircraft. A single integrated rigid foam insulation member or single integrated insulation block may replace multiple known blankets used in existing insulation systems.

Embodiments of the insulation system 100, 100a-100d and insulation method 200, 300 preferably eliminate the use of known fastener devices to secure the rigid foam insulation members to each other or to the frame members of transport vehicles, and in particular, to the aircraft frame members of aircraft, and thus, installation time and labor may be reduced, which may, in turn, reduce the overall costs of installation, labor, and manufacturing. Further, eliminating the use of known fastener devices to secure the rigid foam insulation members to each other or to the frame members of transport vehicles, and in particular, to the aircraft frame members of aircraft, may eliminate or minimize procurement and storage of the known fastener devices, may reduce the lead time for installation, may reduce the overall part count, and may reduce the time, space, and labor to organize and inventory the known fastener devices, all of which may, in turn, reduce the costs of installation, labor, and manufacturing. Moreover, eliminating the use of known fastener devices to secure the rigid foam insulation members to each other or to the frame members of transport vehicles, and in particular, to the aircraft frame members of aircraft, may decrease the overall weight of the transport vehicle, which can, in turn, decrease fuel costs. In addition, eliminating the use of known fastener devices to secure the rigid foam insulation members to each other or to the frame members of transport vehicles, and in particular, to the aircraft frame members of aircraft, may eliminate acoustic leakage or thermal leakage. Thus, embodiments of the insulation system 100, 100a-100d and insulation method 200, 300 may provide improved acoustic performance as compared to equivalent weight transport vehicles that do not have such insulation system and insulation method. Finally, embodiments of the insulation system 100, 100a-100d and insulation method 200, 300 may be easy to use and install, may provide water resistance, may be durable, and may be cost effective in terms of fabrication, installation, and life cycle.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An insulation system for a transport vehicle, the system comprising:
   first and second frame members in adjacent attachment to a wall of a transport vehicle;
   a first rigid foam insulation member having a first sidewall and a second sidewall, the first insulation member extending between the first and second frame members and extending around a first free end of the first frame member;
   a second rigid foam insulation member adjacent the first sidewall of the first insulation member, the second insulation member extending around a first free end of the second frame member, and the first sidewall of the first insulation member being configured to integrate with a second sidewall of the second insulation member; and,
   a third rigid foam insulation member adjacent the second sidewall of the first insulation member, the second sidewall of the first insulation member being configured to integrate with a first sidewall of the third insulation member;
   wherein each of the first, second, and third insulation members is surrounded by a protective layer, and installed in the transport vehicle, the first, second, and third insulation members are in contact with respect to each other, such that the first insulation member is secured in place without use of any fastener device between adjacent second insulation member and adjacent third insulation member, by one or more compression forces on the first insulation member from the second and third insulation members.

2. The system of claim 1, further comprising a barrier layer selected from the group comprising a flame penetration resistant barrier material comprising ceramic fiber paper; an acoustic barrier material comprising fiberglass insulation, foam insulation such as polyimide or melamine, or nonwoven material such as meta-aramid felt; a thermal barrier material comprising felt or fiberglass; and a water repellant barrier material comprising hydrophobic treated fiberglass insulation, hydrophobic treated open cell foam insulation such as polyimide or melamine foam, hydrophically treated nonwoven material such as meta-aramid felt, or closed cell foam.

3. The system of claim 1, further comprising a flexible insulation layer coupled to one or more of the first, second, and third insulation members, wherein the flexible insulation layer is selected from the group comprising a flame penetration resistant barrier material comprising ceramic fiber paper; an acoustic barrier material comprising fiberglass insulation, foam insulation such as polyimide or melamine, or nonwoven material such as meta-aramid felt; a thermal barrier material comprising felt or fiberglass; and a water repellant barrier material comprising hydrophobic treated fiberglass insulation, hydrophobic treated open cell foam insulation such as polyimide or melamine foam, hydrophically treated nonwoven material such as meta-aramid felt, or closed cell foam.

4. The system of claim 1, further comprising a third frame member attached to the wall of the transport vehicle and adjacent to the first frame member, wherein the third insulation member extends over a first free end of the third frame member.

5. The system of claim 1, wherein one or more of the first, second, and third insulation members comprises a first portion and a second portion made of identical or different materials.

6. The system of claim 1, wherein the first, second, and third insulation members are each made of one or more materials selected from the group comprising an open cell foam; a polymeric, cellular solid foam; a melamine foam; and a closed cell foam.

7. The system of claim 1, wherein the system comprises multiple frame members attached in parallel along a length of one or more transport vehicle walls, wherein each frame member is substantially covered with a rigid foam insulation member and each rigid foam insulation member is held in place in compression fit between two adjacent foam insulation members, such that sidewalls of the rigid foam insulation member are configured to interlock with sidewalls of the two adjacent foam insulation members.

8. The system of claim 1, wherein the transport vehicle is selected from the group comprising an aircraft, an aerospace vehicle, a space launch vehicle, a rocket, a satellite, a rotorcraft, a watercraft, a boat, a train, an automobile, a truck, and a bus.

9. The system of claim 1, wherein the protective layer is a polymeric film selected from the group comprising PEKK (polyether ketone ketone) films, PEEK (polyether ether ketone) films, PVF (polyvinyl fluoride) films, and polyimide films, polyester (PET-polyethylene terephthalate) films.

10. An insulation system for an aircraft, the system comprising:
   first and second frame members in adjacent attachment to a fuselage wall of an aircraft;
   a first rigid foam insulation member having a first sidewall and a second sidewall, the first insulation member extending to a position between the first and second frame members and substantially around the first frame member;
   a second rigid foam insulation member adjacent the first sidewall of the first insulation member, the second insulation member having a first sidewall and a second sidewall and substantially around the second frame member, and the first sidewall of the first insulation member being configured to integrate with the second sidewall of the second insulation member; and,
   a third rigid foam insulation member adjacent the second sidewall of the first insulation member, the third insulation member having a first sidewall and a second sidewall and substantially around a third frame member, and the second sidewall of the first insulation member being configured to integrate with the first sidewall of the third insulation member;
   wherein each of the first, second, and third insulation members is surrounded by a protective layer, and installed in the aircraft, the first, second, and third insulation members are in contact with respect to each other, such that the first insulation member is secured in place without use of any fastener device between adjacent second insulation member and adjacent third insulation member, by one or more compression forces on the first insulation member from the second and third insulation members.

11. The system of claim 10, further comprising a barrier layer selected from the group comprising a flame penetration resistant barrier material comprising ceramic fiber paper; an acoustic barrier material comprising fiberglass insulation, foam insulation such as polyimide or melamine, or nonwoven material such as meta-aramid felt; a thermal barrier material comprising felt or fiberglass; and a water repellant barrier material comprising hydrophobic treated fiberglass insulation, hydrophobic treated open cell foam insulation such as polyimide or melamine foam, hydrophically treated nonwoven material such as meta-aramid felt, or closed cell foam.

12. The system of claim 10, further comprising a flexible insulation layer coupled to one or more of the first, second, and third insulation members, wherein the flexible insulation layer comprises a material selected from the group comprising a flame penetration resistant barrier material comprising ceramic fiber paper; an acoustic barrier material comprising fiberglass insulation, foam insulation such as polyimide or melamine, or nonwoven material such as meta-aramid felt; a thermal barrier material comprising felt or fiberglass; and a water repellant barrier material comprising hydrophobic treated fiberglass insulation, hydrophobic treated open cell foam insulation such as polyimide or melamine foam, hydrophically treated nonwoven material such as meta-aramid felt, or closed cell foam.

13. The system of claim 10, wherein one or more of the first, second, and third insulation members comprises a first portion and a second portion made of identical or different materials.

14. The system of claim 10, wherein the first, second, and third insulation members are each made of one or more materials selected from the group comprising an open cell foam; a polymeric, cellular solid foam; a melamine foam; and a closed cell foam.

15. A method of insulating a frame member of a transport vehicle, the method comprising:
   installing in a transport vehicle at least first and second frame members in adjacent attachment to a wall of the transport vehicle;
   installing in the transport vehicle at least first, second, and third rigid foam insulation members each having a first sidewall and a second sidewall and each surrounded by a protective layer;
   substantially wrapping around the first frame member with the first rigid foam insulation member and substantially wrapping around the second frame member with the second rigid foam insulation member;
   positioning the first insulation member between the second insulation member and the third insulation member; and,
   contacting the first sidewall of the first insulation member with the second sidewall of the second insulation member, and contacting the second sidewall of the first insulation member with the first sidewall of the third insulation member, such that the first insulation member is secured in place without use of any fastener device between adjacent second insulation member and adjacent third insulation member, by one or more compression forces on the first insulation member from the second and third insulation members.

16. The method of claim 15, further comprising coupling a barrier layer selected from the group comprising a flame penetration resistant barrier material comprising ceramic fiber paper; an acoustic barrier material comprising fiberglass insulation, foam insulation such as polyimide or melamine, or nonwoven material such as meta-aramid felt; a thermal barrier material comprising felt or fiberglass; and a water repellant barrier material comprising hydrophobic treated fiberglass insulation, hydrophobic treated open cell foam insulation such as polyimide or melamine foam, hydrophically treated nonwoven material such as meta-aramid felt, or closed cell foam.

17. The method of claim 15, further comprising coupling a flexible insulation layer to one or more of the first, second, and third insulation members, wherein the flexible insulation layer comprises a material selected from the group comprising a flame penetration resistant barrier material comprising ceramic fiber paper; an acoustic barrier material comprising fiberglass insulation, foam insulation such as polyimide or melamine, or nonwoven material such as meta-aramid felt; a thermal barrier material comprising felt or fiberglass; and a water repellant barrier material comprising hydrophobic treated fiberglass insulation, hydrophobic treated open cell foam insulation such as polyimide or melamine foam, hydrophically treated nonwoven material such as meta-aramid felt, or closed cell foam.

18. The method of claim 15, wherein one or more of the first, second, and third insulation members comprises a first portion and a second portion made of identical or different materials.

19. The method of claim 15, wherein the first, second, and third insulation members are each made of one or more materials selected from the group comprising an open cell foam; a polymeric, cellular solid foam; a melamine foam; and a closed cell foam.

20. The method of claim 15, wherein the transport vehicle is selected from the group comprising an aircraft, an aerospace vehicle, a space launch vehicle, a rocket, a satellite, a rotorcraft, a watercraft, a boat, a train, an automobile, a truck, and a bus.

21. A method of insulating an aircraft frame member, the method comprising:
   installing in an aircraft at least first and second aircraft frame members in adjacent attachment to a fuselage wall of the aircraft;
   installing in the aircraft at least first, second, and third rigid foam insulation members each having a first sidewall and a second sidewall and each surrounded by a protective layer;
   substantially wrapping around the first aircraft frame member with the first rigid foam insulation member and substantially wrapping around the second aircraft frame member with the second rigid foam insulation member;
   positioning the first insulation member between the second insulation member and the third insulation member; and,
   contacting the first sidewall of the first insulation member with the second sidewall of the second insulation member, and contacting the second sidewall of the first insulation member with the first sidewall of the third insulation member, such that the first insulation member is secured in place without use of any fastener device between adjacent second insulation member and adjacent third insulation member, by one or more compression forces on the first insulation member from the second and third insulation members.

22. The method of claim 21, further comprising coupling a barrier layer selected from the group comprising a flame penetration resistant barrier material comprising ceramic fiber paper; an acoustic barrier material comprising fiberglass insulation, foam insulation such as polyimide or melamine, or nonwoven material such as meta-aramid felt; a thermal barrier material comprising felt or fiberglass; and a water repellant barrier material comprising hydrophobic treated fiberglass insulation, hydrophobic treated open cell foam insulation such as polyimide or melamine foam, hydrophically treated nonwoven material such as meta-aramid felt, or closed cell foam.

23. The method of claim 21, further comprising coupling a flexible insulation layer to one or more of the first, second, and third insulation members, wherein the flexible insulation layer comprises a material selected from the group comprising a flame penetration resistant barrier material comprising ceramic fiber paper; an acoustic barrier material comprising fiberglass insulation, foam insulation such as polyimide or melamine, or nonwoven material such as meta-aramid felt; a thermal barrier material comprising felt or fiberglass; and a water repellant barrier material comprising hydrophobic treated fiberglass insulation, hydrophobic treated open cell foam insulation such as polyimide or melamine foam, hydrophically treated nonwoven material such as meta-aramid felt, or closed cell foam.

24. The method of claim 21, wherein one or more of the first, second, and third insulation members comprises a first portion and a second portion made of identical or different materials.

25. The method of claim 21, wherein the first, second, and third insulation members are each made of one or more materials selected from the group comprising an open cell foam; a polymeric, cellular solid foam; a melamine foam; and a closed cell foam.

* * * * *